United States Patent
Whitman

(10) Patent No.: US 11,447,195 B2
(45) Date of Patent: Sep. 20, 2022

(54) LEG SWING TRAJECTORIES

(71) Applicant: Boston Dynamics, Inc., Waltham, MA (US)

(72) Inventor: Eric Whitman, Waltham, MA (US)

(73) Assignee: Boston Dynamics, Inc., Waltham, MA (US)

( * ) Notice: Subject to any disclaimer, the term of this patent is extended or adjusted under 35 U.S.C. 154(b) by 557 days.

(21) Appl. No.: 16/570,152

(22) Filed: Sep. 13, 2019

(65) Prior Publication Data

US 2021/0039731 A1 Feb. 11, 2021

Related U.S. Application Data

(60) Provisional application No. 62/883,502, filed on Aug. 6, 2019.

(51) Int. Cl.
*B62D 57/032* (2006.01)
*B25J 9/16* (2006.01)

(52) U.S. Cl.
CPC .......... *B62D 57/032* (2013.01); *B25J 9/1666* (2013.01); *G05B 2219/39096* (2013.01); *G05B 2219/45083* (2013.01); *G05D 2201/0217* (2013.01)

(58) Field of Classification Search
CPC .................. B25J 9/162; B25J 9/1666; G05B 2219/39096; G05B 2219/45083; B62D 57/02; B62D 57/024; B62D 57/032; G05D 2201/0217
See application file for complete search history.

(56) References Cited

U.S. PATENT DOCUMENTS

| | | | |
|---|---|---|---|
| 8,386,076 B2 | 2/2013 | Honda et al. | |
| 9,387,588 B1 | 7/2016 | Blankespoor et al. | |
| 9,969,087 B1 | 5/2018 | Blankespoor | |
| 2013/0178983 A1* | 7/2013 | Watabe | B62D 57/032 700/258 |

OTHER PUBLICATIONS

International Search Report, PCT/US2019/051058, dated Apr. 21, 2020, 17 pages.
Gong et al., "Bionic Quadruped Robot Dynamic Gait Control Strategy Based on Twenty Degrees of Freedom," Jan. 1, 2018, 7 pages.

* cited by examiner

*Primary Examiner* — Spencer D Patton
(74) *Attorney, Agent, or Firm* — Knobbe, Martens, Olson & Bear, LLP

(57) ABSTRACT

A method of planning a swing trajectory for a leg of a robot includes receiving an initial position of a leg of the robot, an initial velocity of the leg, a touchdown location, and a touchdown target time. The method also includes determining a difference between the initial position and the touchdown location and separating the difference between the initial position and the touchdown location into a horizontal motion component and a vertical motion component. The method also includes selecting a horizontal motion policy and a vertical motion policy to satisfy the motion components. Each policy produces a respective trajectory as a function of the initial position, the initial velocity, the touchdown location, and the touchdown target time. The method also includes executing the selected policies to swing the leg of the robot from the initial position to the touchdown location at the touchdown target time.

22 Claims, 19 Drawing Sheets

| Tier | Tie Breaker |
|---|---|
| Success | Total Undesirability |
| XY-Success; Z-Impossible | Combination of: Collision Severity & Undesirability |
| Cliff Scraping | Horizontal Margin |
| Knee-Terrain Collision | Collision Severity; Undesirability if close |
| Knee Self-Collision | Collision Severity; Miss distance if close |
| Terrain Collision | Combination of: Collision Severity & Undesirability |
| XY Can't Reach Target | Miss Distance (with hysteresis) |
| Self Collision | Collision Severity; Miss distance if close |
| Default | N/A – Only one default |
| Violates Constraints | N/A – Never select |

LEG SWING TRAJECTORIES

CROSS REFERENCE TO RELATED APPLICATION

This U.S. patent application claims priority under 35 U.S.C. § 119(e) to U.S. Provisional Application 62/883,502, filed on Aug. 6, 2019, which is hereby incorporated by reference in its entirety.

TECHNICAL FIELD

This disclosure relates to leg swing trajectories of a robot.

BACKGROUND

Robotic devices are increasingly being used in constrained or otherwise restricted environments to perform a variety of tasks or functions. These robotic devices often need to efficiently navigate through these constrained environments without stepping on or bumping into obstacles. As these robotic devices become more prevalent, there is a need for real-time navigation and step planning that avoids contact with obstacles while maintaining balance and speed.

SUMMARY

One aspect of the disclosure provides a method of planning a swing trajectory for a leg of a robot. The method includes receiving, at data processing hardware of a robot, an initial position of a leg of the robot and an initial velocity of the leg of the robot. The method also includes receiving, at the data processing hardware, a touchdown location for the leg and a touchdown target time for the leg. The touchdown target time represents an amount of time until the leg of the robot should touchdown at the touchdown location. The method also includes determining, by the data processing hardware, a difference between the initial position of the leg and the touchdown location and separating, by the data processing hardware, the difference between the initial position of the leg and the touchdown location into a horizontal motion component and a vertical motion component. The method also includes selecting, by the data processing hardware, a horizontal motion policy from a set of horizontal motion policies to satisfy the horizontal motion component. Each horizontal motion policy produces a horizontal trajectory as a function of the initial position of the leg, the initial velocity of the leg, the touchdown location of the leg, and the touchdown target time of the leg. The method also includes selecting, by the data processing hardware, a vertical motion policy from a set of vertical motion policies to satisfy the vertical motion component. Each vertical motion policy produces a vertical trajectory as a function of the initial position of the leg, the initial velocity of the leg, the touchdown location of the leg, and the touchdown target time of the leg. The method also includes executing, by the data processing hardware, the selected horizontal motion policy and the selected vertical motion policy to swing the leg of the robot from the initial position to the touchdown location at the touchdown target time.

Implementations of the disclosure may include one or more of the following optional features. In some implementations, the method includes determining, by the data processing hardware, a most aggressive vertical motion policy of the set of vertical motion policies. The most aggressive vertical policy maximizes vertical acceleration of the leg within a vertical acceleration limit of the leg and maximizes vertical velocity of the leg within a vertical velocity limit of the leg. Selecting the horizontal motion policy from the set of horizontal motion policies, in some examples, includes evaluating each horizontal motion policy of the set of horizontal motion policies with the most aggressive vertical motion policy. Optionally, selecting the horizontal motion policy from the set of horizontal motion policies includes assigning each horizontal motion policy of the set of horizontal motion policies a tier from a plurality of tiers. Each tier is associated with an amount of preference for selecting the respective tier and each tier includes a tiebreaking parameter. The tiebreaking parameter is associated with each horizontal motion policy of the set of horizontal motion policies. Selecting the horizontal motion policy from the set of horizontal motion policies may also include selecting the horizontal motion policy from the set of horizontal motion policies based on the assigned tiers and the tiebreaking parameters.

The tiebreaking parameter, in some implementations, includes a total undesirability based on a sum of a horizontal undesirability and a vertical undesirability. Selecting the vertical motion policy from the set of vertical motion policies may occur after selecting the horizontal motion policy from the set of horizontal motion policies. In some examples, selecting the vertical motion policy from the set of vertical motion policies includes selecting the vertical motion policy from the set of vertical motion policies associated with a minimum acceleration and a minimum velocity that satisfies the vertical motion component.

The method, optionally, includes receiving, at the data processing hardware, an indication of a trip by the robot. In response to receiving the indication of the trip by the robot, the method may include selecting, by the data processing hardware, one of a horizontal motion policy from a second set of horizontal motion policies or a vertical motion policy from a second set of vertical motion policies. The second set of horizontal motion policies are associated with tripping and the second set of vertical motion policies are also associated with tripping. Selecting the horizontal motion policy from the set of horizontal motion policies may include evaluating each horizontal motion policy of the set of horizontal motion policies with a simple analysis and evaluating a sub-set of the set of horizontal motion policies with a detailed analysis based on the simple analysis.

In some implementations, the method further includes receiving, at the data processing hardware, the touchdown target time for each of a plurality of legs of the robot, determining, at the data processing hardware, a touchdown order of the legs based on the touchdown target time for each of the plurality of legs of the robot, and selecting, by the data processing hardware, the horizontal motion policy and the vertical motion policy for each leg in a planning order based on the touchdown order. Optionally, each vertical motion policy of the set of vertical motion policies includes a maximum velocity, a maximum acceleration, and a swing height. At least one horizontal motion policy of the set of horizontal motion policies may include a lateral motion policy and a longitudinal motion policy.

Another aspect of the disclosure provides a robot that includes a body and legs coupled to the body and configured to maneuver the robot about an environment. The robot also includes data processing hardware in communication with the legs and memory hardware in communication with the data processing hardware. The memory hardware stores instructions that when executed on the data processing hardware cause the data processing hardware to perform operations. The operations include receiving an initial position of a leg of the robot and an initial velocity of the leg of the robot. The operations also include receiving, at the data processing hardware, a touchdown location for the leg and a touchdown target time for the leg. The touchdown target time represents an amount of time until the leg of the robot should touchdown at the touchdown location. The operations also include determining a difference between the initial position of the leg and the touchdown location and separating the difference between the initial position of the leg and the touchdown location into a horizontal motion component and a vertical motion component. The operations also include selecting a horizontal motion policy from a set of horizontal motion policies to satisfy the horizontal motion component. Each horizontal motion policy produces a horizontal trajectory as a function of the initial position of the leg, the initial velocity of the leg, the touchdown location of the leg, and the touchdown target time of the leg. The operations also include selecting a vertical motion policy from a set of vertical motion policies to satisfy the vertical motion component. Each vertical motion policy produces a vertical trajectory as a function of the initial position of the leg, the initial velocity of the leg, the touchdown location of the leg, and the touchdown target time of the leg. The operations also include executing the selected horizontal motion policy and the selected vertical motion policy to swing the leg of the robot from the initial position to the touchdown location at the touchdown target time.

Implementations of the disclosure may include one or more of the following optional features. In some implementations, the operations include determining a most aggressive vertical motion policy of the set of vertical motion policies. The most aggressive vertical policy maximizes vertical acceleration of the leg within a vertical acceleration limit of the leg and maximizes vertical velocity of the leg within a vertical velocity limit of the leg. Selecting the horizontal motion policy from the set of horizontal motion policies, in some examples, includes evaluating each horizontal motion policy of the set of horizontal motion policies with the most aggressive vertical motion policy. Optionally, selecting the horizontal motion policy from the set of horizontal motion policies includes assigning each horizontal motion policy of the set of horizontal motion policies a tier from a plurality of tiers. Each tier is associated with an amount of preference for selecting the respective tier and each tier includes a tiebreaking parameter. The tiebreaking parameter is associated with each horizontal motion policy of the set of horizontal motion policies. Selecting the horizontal motion policy from the set of horizontal motion policies may also include selecting the horizontal motion policy from the set of horizontal motion policies based on the assigned tiers and the tiebreaking parameters.

The tiebreaking parameter, in some implementations, includes a total undesirability based on a sum of a horizontal undesirability and a vertical undesirability. Selecting the vertical motion policy from the set of vertical motion policies may occur after selecting the horizontal motion policy from the set of horizontal motion policies. In some examples, selecting the vertical motion policy from the set of vertical motion policies includes selecting the vertical motion policy from the set of vertical motion policies associated with a minimum acceleration and a minimum velocity that satisfies the vertical motion component.

The operations, optionally, include receiving an indication of a trip by the robot. In response to receiving the indication of the trip by the robot, the operations may include selecting one of a horizontal motion policy from a second set of horizontal motion policies or a vertical motion policy from a second set of vertical motion policies. The second set of horizontal motion policies are associated with tripping and the second set of vertical motion policies are also associated with tripping. Selecting the horizontal motion policy from the set of horizontal motion policies may include evaluating each horizontal motion policy of the set of horizontal motion policies with a simple analysis and evaluating a sub-set of the set of horizontal motion policies with a detailed analysis based on the simple analysis.

In some implementations, the operations further include receiving the touchdown target time for each of a plurality of legs of the robot, determining a touchdown order of the legs based on the touchdown target time for each of the plurality of legs of the robot, and selecting the horizontal motion policy and the vertical motion policy for each leg in a planning order based on the touchdown order. Optionally, each vertical motion policy of the set of vertical motion policies includes a maximum velocity, a maximum acceleration, and a swing height. At least one horizontal motion policy of the set of horizontal motion policies may include a lateral motion policy and a longitudinal motion policy.

DESCRIPTION OF DRAWINGS

FIG. 3 is an example table of policy tiers and tiebreakers.

Like reference symbols in the various drawings indicate like elements.

DETAILED DESCRIPTION

As legged robotic devices (also referred to as "robots") become more prevalent, there is an increasing need for the robots to navigate environments that are constrained in a number of ways. For example, a robot may need to traverse a cluttered room with large and small objects littered around on the floor. Or, as another example, a robot may need to negotiate a staircase. Typically, navigating these sort of environments has been a slow and arduous process that results in the legged robot frequently stopping, colliding with objects, and/or becoming unbalanced. Implementations herein are directed toward systems and methods for leg swing trajectory planning for generating leg swing trajectories in real-time, thus helping a legged robotic device to navigate a constrained environment quickly and efficiently while maintaining smoothness and balance.

Figure 1:
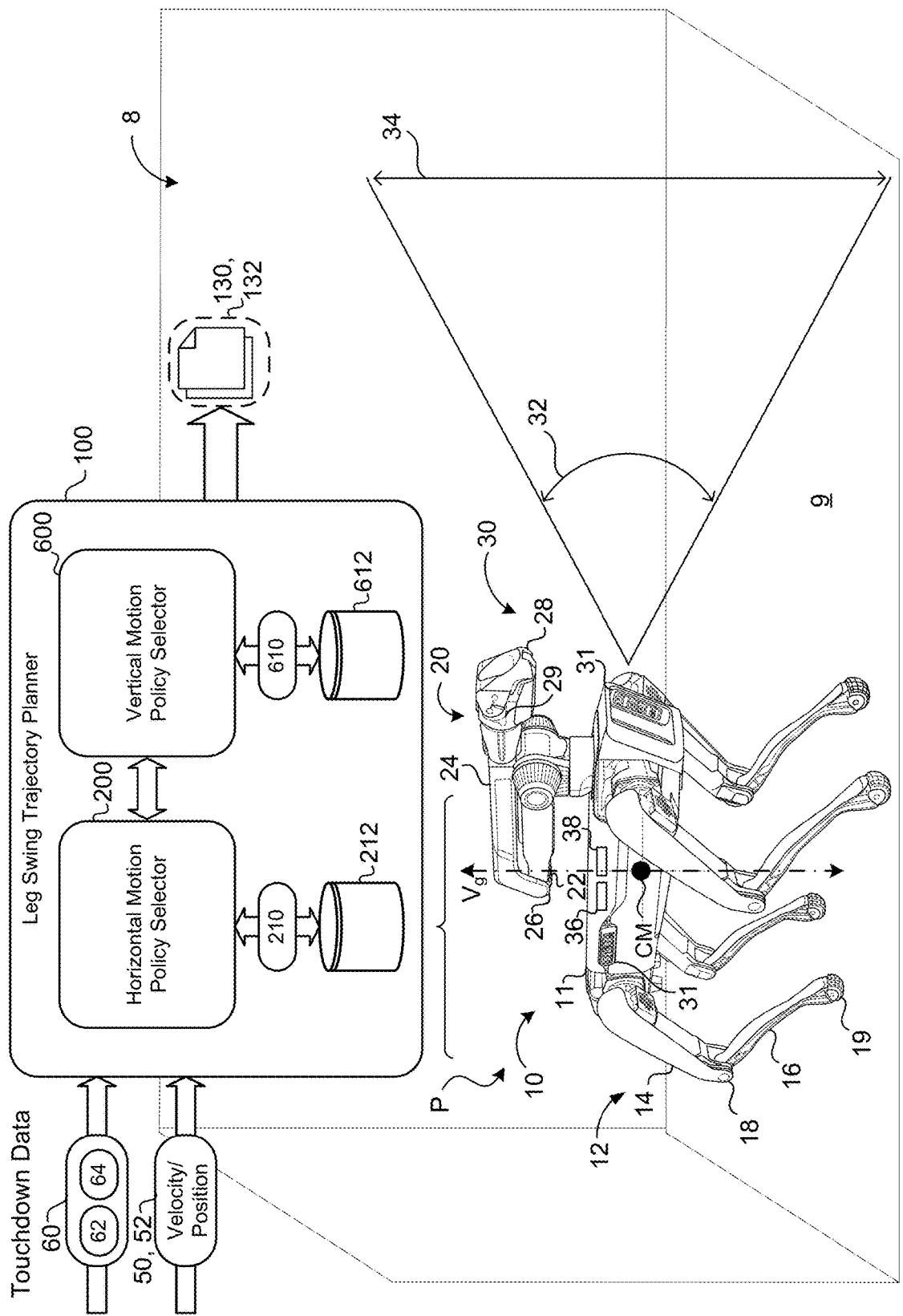
FIG. 1 is a schematic view of an example robot executing a swing trajectory planner for planning a swing trajectory of a leg of the robot.

Referring to FIG. 1, a robot or robotic device 10 includes a body 11 and two or more legs 12. The robot 10 is configured to execute a swing leg trajectory planner 100 for enabling the robot 10 to navigate a constrained environment 8. Each leg 12 is coupled to the body 11 and may have an upper portion 14 and a lower portion 16 separated by a leg joint 18. The lower portion 16 of each leg 12 ends in a foot 19. The foot 19 of each leg is optional and the terminal end of the lower portion of one or more of the leg 12 may be coupled to a wheel or the distal end of each leg 12 may directly contact the a ground surface 9. The robot 10 has a vertical gravitational axis Vg along a direction of gravity, and a center of mass CM, which is a point where the weighted relative position of the distributed mass of the robot 10 sums to zero. The robot 10 further has a pose P based on the CM relative to the vertical gravitational axis Vg (i.e., the fixed reference frame with respect to gravity) to define a particular attitude or stance assumed by the robot 10. The attitude of the robot 10 can be defined by an orientation or an angular position of the robot 10 in space. Movement by the legs 12 relative to the body 11 alters the pose P of the robot 10 (i.e., the combination of the position of the CM of the robot and the attitude or orientation of the robot 10).

In some implementations, the robot 10 further includes one or more appendages, such as an articulated arm 20 disposed on the body 11 and configured to move relative to the body 11. The articulated arm 20 may have five-degrees or more of freedom. Moreover, the articulated arm 20 may be interchangeably referred to as a manipulator arm or simply an appendage. In the example shown, the articulated arm 20 includes two portions 22, 24 rotatable relative to one another and also the body 11; however, the articulated arm 20 may include more or less portions without departing from the scope of the present disclosure. The first portion 22 may be separated from second portion 24 by an articulated arm joint 26. An end effector 28, which may be interchangeably referred to as a manipulator head 28, may be coupled to a distal end of the second portion 24 of the articulated arm 20 and may include one or more actuators 29 for gripping/grasping objects.

The robot 10 also includes a vision system 30 with at least one imaging sensor or camera 31, each sensor or camera 31 capturing image data or sensor data 17 of the environment 8 surrounding the robot 10 with an angle of view 32 and within a field of view 34. The vision system 30 may be configured to move the field of view 34 by adjusting the angle of view 32 or by panning and/or tilting (either independently or via the robot 10) the camera 31 to move the field of view 34 in any direction. Alternatively, the vision system 30 may include multiple sensors or cameras 31 such that the vision system 30 captures a generally 360-degree field of view around the robot 10. The camera(s) 31 of the vision system 30, in some implementations, include one or more stereo cameras (e.g., one or more RGBD stereo cameras). In other examples, the vision system 30 includes one or more radar sensors such as a scanning light-detection and ranging (LIDAR) sensor, or a scanning laser-detection and ranging (LADAR) sensor, a light scanner, a time-of-flight sensor, or any other three-dimensional (3D) volumetric image sensor (or any such combination of sensors). The vision system 30 provides image data or sensor data 17 derived from image data captured by the cameras or sensors 31 to data processing hardware 36 of the robot 10. The data processing hardware 36 is in digital communication with memory hardware 38 and, in some implementations, may be a remote system. The remote system may be a single computer, multiple computers, or a distributed system (e.g., a cloud environment) having scalable/elastic computing resources and/or storage resources.

The robot 10 executes the swing leg trajectory planner 100 on the data processing hardware 36. The leg swing trajectory planner 100 receives an initial or current position or location 50 and an initial or current velocity 52 of a leg 12 of the robot 10 (e.g., from sensors monitoring the corresponding leg 12). The swing leg trajectory planner 100 also receives touchdown data 60 for the leg 12. The touchdown data 60 includes a touchdown location 62 and a touchdown target time 64. The touchdown location 62 represents a location on the ground surface 9 that the leg should contact in order to complete a step. The touchdown target time 64 represents an amount of time until the leg 12 of the robot 10 should touchdown at the touchdown location 62. That is, the touchdown target time 64 represents a point in time (or window of time) that the leg 12 should contact the ground surface 9 at the touchdown location 62 to maintain gait, balance, timing, etc.

The leg swing trajectory planner 100, in some implementations, determines a difference between the initial or current position of the leg 12 and the touchdown location 62. That is, the leg swing trajectory planner 100 determines how far the leg 12 must travel from its initial or current location 50 to arrive at the touchdown location 62. In some implementations, the planner 100 only uses an initial location 50 (e.g., a takeoff location of the foot) and does not rely on real-time positional measurements of the leg during swinging. In other implementations, the planner 100 continually receives the current location 50 of the leg (e.g., via measurement). As used herein, initial location and current location are interchangeable. Similarly, initial velocity 52 and current velocity 52 are also interchangeable. The leg swing trajectory planner 100 decouples or separates the difference between the current position of the leg 12 and the touchdown location 62 into a horizontal motion component and a vertical motion component. Put another way, the leg swing trajectory planner 100 separates the determination of the leg swing trajectory into the horizontal movement (e.g., horizontal motion component) required by the leg 12 and the vertical movement (e.g., vertical motion component) required by the leg 12 in order to reach the touchdown location 62 by the touchdown target time 64. Based at least in part on this difference, a horizontal motion policy selector 200 may select a horizontal motion policy 210 from a set of horizontal motion policies (e.g., from a horizontal motion policy datastore 212) and a vertical motion policy selector 600 may select a vertical motion policy 610 from a set of vertical motion policies 610 (e.g., from a vertical motion policy datastore 612). The selected horizontal motion policy 210 and the selected vertical motion policy 610 collectively provide a set of selected policies 130 to form a swing trajectory 132 that, when executed by the data processing hardware 36 of the robot 10, cause the leg 12 of the robot 10 to swing from the current location 50 to the touchdown location 62 within the touchdown target time 64. Each policy 210, 610 selected by the respective selectors 200, 600 of the planner 100 executes on the data processing hardware 36 of the robot 10 to produce a swing trajectory of the leg 12 as a function of the current position 50 and velocity 52 of the leg and the touchdown location 62 and touchdown target time 64.

In some implementations, at least a portion of the swing leg trajectory planner 100 executes on a remote device in communication with the robot 10. For instance, the horizontal motion policy selector 200 and/or the vertical motion policy selector 600 may execute on a remote device to select the respective policies 210, 610 (e.g., selected set of policies 130) and a control system executing on the robot 10 may receive and execute the set of policies 130 to swing the leg 12 of the robot 10 from the current position 50 to the touchdown location 62 at the touchdown target time 64. Optionally, the entire swing trajectory planner 100 may execute on a remote device and the remote device may control/instruct the robot 10 to swing the legs 12 based on the selected set of policies 130.

Figure 2:
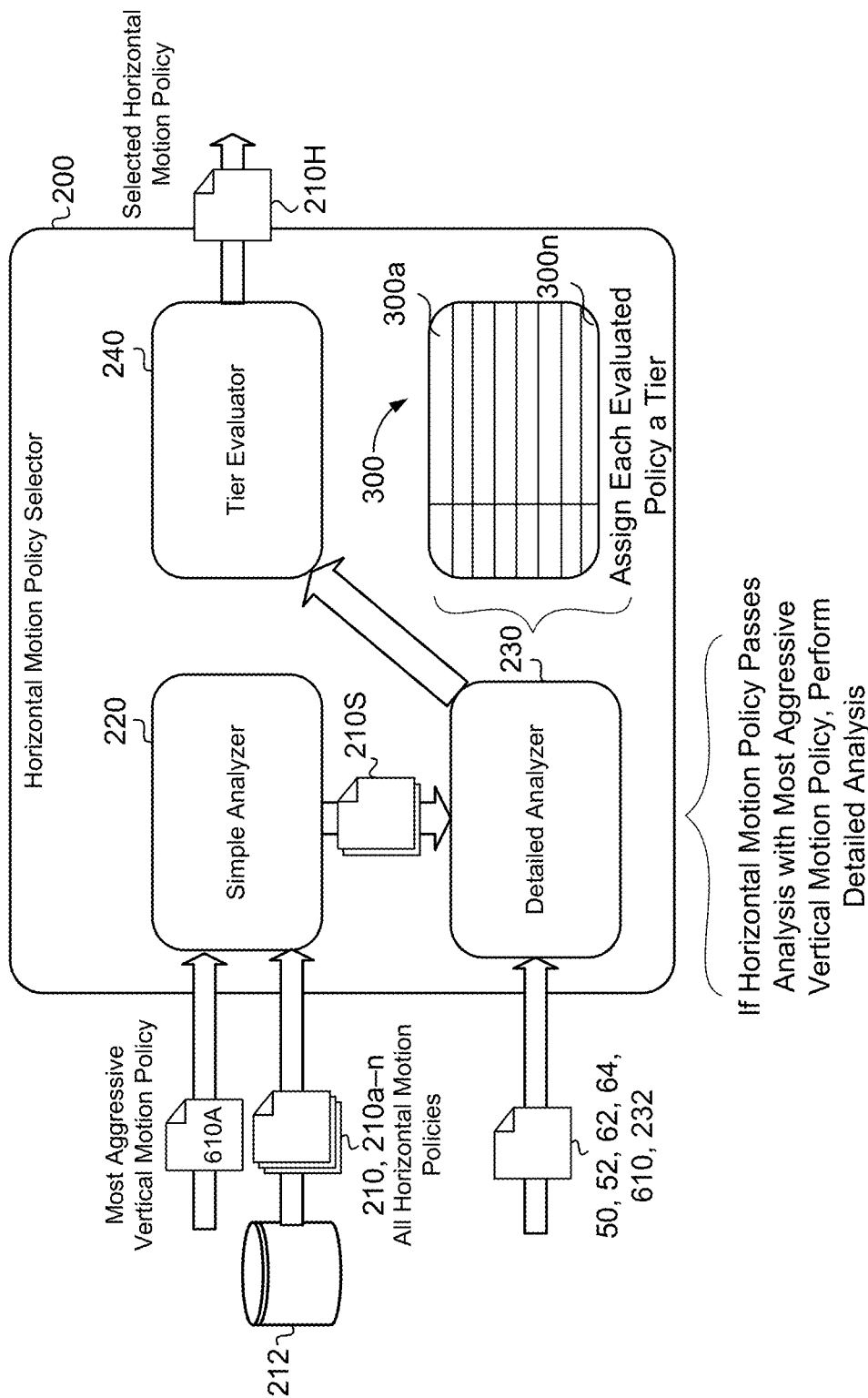
FIG. 2 is a schematic view of an example horizontal motion policy selector of the robot of FIG. 1.

Referring now to FIG. 2, in some implementations, the horizontal motion policy selector 200 includes a simple analyzer 220, a detailed analyzer 230, and a tier evaluator 240. The simple analyzer 220 may receive a most aggressive vertical motion policy 610A and each horizontal motion policy 210, 210a-n of the set of horizontal motion policies stored in datastore 212. In some examples, the simple analyzer 220 quickly analyzes the most aggressive vertical motion policy 610A with each of the horizontal motion policies 210. This is because generally if the most aggressive vertical motion policy 610A fails, all vertical motion policies 610 will fail. The most aggressive vertical motion policy 610 uses the greatest acceleration and velocity within constraints, and therefore when the policy 610A fails to make the touchdown target time 64 or avoid an obstacle, likely no other policy 610 will either. The most aggressive vertical motion policy 610A is defined as a vertical motion policy 610 that instructs the robot 10 to keep the velocity, acceleration, and swing height of the leg 12 as high as possible within any applicable constraints 232. For example, the most aggressive vertical motion policy 610A may nominally accelerate the leg 12 upward (i.e., vertical acceleration) until an upward or vertical velocity limit is hit, then coast upwards at an upward or vertical constant velocity (i.e., at the upward velocity limit). The policy 610A may then accelerate downward until the upward movement of the leg 12 is stopped at a desired swing height (i.e., the maximum swing height). The policy 610A may remain at the desired swing height for as long as possible while still arriving at the touchdown location 62 on time. The most aggressive vertical motion policy 610A may accelerate downward until a downward velocity limit is hit (which may be the same or different than the upward velocity limit), then coast downward at a constant downward velocity (i.e., the downward velocity limit) until the leg 12 achieves touchdown at the touchdown location 62.

When analyzing each horizontal motion policy 210 with the most aggressive vertical motion policy 610A, the simple analyzer 220 may quickly eliminate unsatisfactory horizontal motion policies 210 from the set of horizontal motion policies 210a-n. Specifically, eliminating unsatisfactory horizontal motion policies 210 refers to eliminating these policies 210 as candidates for selection by the horizontal motion policy selector 200. For example, the simple analyzer 220 may evaluate each horizontal motion policy 210 under best case scenarios for the respective policy 210 and measure an amount of total undesirability. Total undesirability may be a sum of horizontal undesirability and vertical undesirability. Horizontal undesirability and vertical undesirability are a measure of undesirable effects from the selected policy. For example, the higher a peak acceleration (i.e., vertical peak acceleration and horizontal peak acceleration) of a policy 210, 610, the greater the undesirability of that policy. Undesirability may be measured based on other characteristics of the policies 610, 210 as well (e.g., peak velocity, touchdown speed, touchdown time, swing height, margin, etc.). Optionally, some policies may have the associated undesirability modified. For example, a preferred policy (e.g., a Cubic policy, as discussed in more detail below) may be weighed by a modifier to reduce overall undesirability. Other, less desirable policies may have a modifier that increases undesirability.

After analyzing each horizontal motion policy 210 with the most aggressive vertical motion policy 610A, the simple analyzer 220 sends a set (i.e., a sub-set of the original set of all horizontal motion policies 610) of the horizontal motion policies 210S that passed the simple analysis to the detailed analyzer 230. For example, policies 210S that have a total undesirability under a threshold amount may be sent to the detailed analyzer. Optionally, whether the simple analyzer 220 passes a respective policy 210 to the detailed analyzer (i.e., whether the policy 210 is included in set 210S) is dependent upon other policies 210. For example, when the simple analyzer 220 determines that a respective policy 210 cannot outperform an already analyzed policy 210, the simple analyzer 220 may decline to pass the respective policy 210 to the detailed analyzer 230. In some implementations, the simple analyzer 220 analyzes the policies 210 in an order designed to analyze the most likely to be best policies 210 first to optimize the evaluation policy by potentially reducing the number of policies 210 that are evaluated. The order may be static or dynamic based on terrain or other constraints.

With continued reference to FIG. 2, the detailed analyzer 230 performs a more thorough analysis than the simple analyzer 220. In some implementations, the detailed analyzer 230 assigns each policy 210 of the set of policies 210S a tier 300, 300a-n (FIG. 3). Each tier 300, in some examples, is associated with an amount of preference for selecting the respective tier. That is, each tier has an amount of selection desirability. To assign the tiers 300, the detailed analyzer 230 performs a number of calculations using, for example, the touchdown location 62, the touchdown target time 64, the current position 50, the current velocity 52, and any applicable constraints 232 (e.g., maximum acceleration constraints, maximum velocity constraints, obstacle constraints, etc.). The detailed analyzer passes the set of policies 210S and the assigned tiers 300 to the tier evaluator 240. The tier evaluator 240 orders the tiers 300 (and subsequently the policies 210 assigned to the tiers 300) from most desirable to least desirable (i.e., the amount of preference for selecting the tier) and then selects the policy 210H that is assigned to the most desirable tier 300. The tier evaluator 240 may determine the order of the tiers 300 statically based on predetermined instructions or dynamically based on the current environment or constraints 232.

Referring now to FIG. 3, each tier 300 may have an associated tiebreaker or tiebreaking parameter 302, 302a-n. The tier evaluator 240 uses the tiebreaker when more than one policy 210 share the most desirable tier 300. For example, the most desirable tier 300 may be "Success" with a tiebreaker 302 of total undesirability. That is, the most desirable tier 300 may be a tier for policies 210 that cause the foot 19 of the leg 12 of the robot 10 to arrive at the touchdown location 62 at the touchdown target time 64. When multiple policies 210 are assigned the Success tier 300, the tier evaluator 240 may select the policy 210 with the lowest total undesirability from among the policies 210 assigned the Success tier 300. In some implementations, when a specific policy 210 (e.g., a Cubic policy 210 or other preferred policy 210) is assigned the Success tier 300, the specific policy 210 may be selected without evaluating any other policies 210. In this situation, no other policy may be better than the select policy 210 and the overall computation required to select the policy 210 is greatly reduced. In another example, the second most desirable tier 300 may be XY-Success; Z-Impossible. The tier evaluator 240 may assign policies 210 to this tier 300 that successfully arrive at the touchdown location 62 at the touchdown target time 64 in the horizontal dimension (i.e., XY), but there is no vertical motion policy 610 that successfully arrives at the touchdown location 62 at the touchdown target time 64. For example, the foot may be unable to make it to the desired touchdown height (i.e., the height component of the touchdown location 62) given current position 50 and/or current velocity 52 and constraints 232. For this tier 300, the tiebreaker 302 may be a combination of a severity of any collisions and total undesirability. When, for example, no policies 210 are assigned to the success tier 300 and two or more policies 210 are assigned to the XY-Success; Z-Impossible tier 300, the tier evaluator 240 may use the tiebreaker 302 to select the policy 210.

Figure 4:
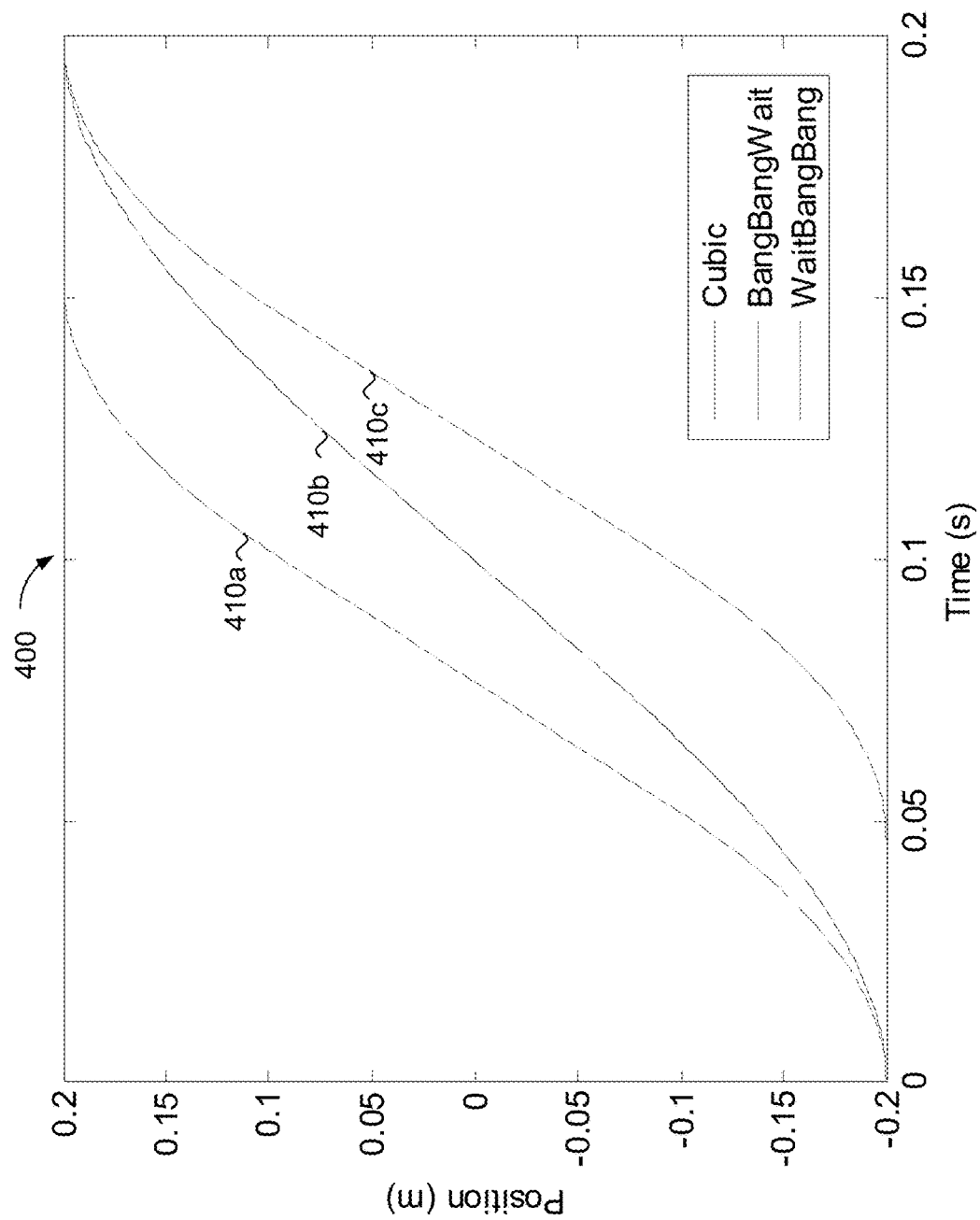
FIG. 4 is an example trajectory plot of multiple different horizontal motion policies.

Referring now to FIG. 4, horizontal trajectories 410a-c are illustrated on a plot 400 with a y-axis representing position (e.g., in meters) and an x-axis representing time (e.g., in seconds). A horizontal trajectory is the distance the leg must travel from the current location to the touchdown location 62 in the horizontal plane (i.e., laterally and/or forward and backward). For example, trajectory 410a may represent a Cubic horizontal motion policy 210, the trajectory 410b may represent a BangBangWait (BBW) horizontal motion policy 210, and the trajectory 410c may represent a WaitBangBang (WBB) horizontal motion policy 210. The Cubic horizontal motion policy 210 follows the path of a cubic polynomial. The BBW horizontal motion policy 210 accelerates as fast as possible (within constraints 232) to reach the maximum velocity as fast as possible, and then coasts until deceleration is required. The WBB horizontal motion policy 210 is the opposite of the BBW horizontal motion policy 210, in that the WBB horizontal motion policy coasts at the current velocity 52 for as long as possible and then accelerates as fast as possible to the maximum velocity when required in order to still make the touchdown location 62 by the touchdown target time 64.

The detailed analyzer 230 may assign policies 210 to any number of tiers 300. In some examples, the tiers 300 include Cliff Scraping with a tiebreaker of horizontal margin. For example, the tiers 300 may include Knee-Terrain Collision and Knee Self-Collision with tiebreakers 302 of collision severity, undesirability, and/or miss distance (e.g., how close the leg of the robot is to missing the other leg/obstacle). Optionally, the planner 100, based on predicted hip positions and planned foot positions, may compute and predict current and future knee positions of the robot 10. Based on the computed knee position, the system 100 may compare the trajectory of the selected policy and compare it against the terrain near the robot 10.

Other tiers 300 may include Terrain Collision with collision severity and/or undesirability as tiebreakers and XY Can't Reach Target (i.e., the leg 12 cannot make it to the touchdown location 62) with miss distance as the tiebreaker 302. The miss distance may include hysteresis. Optionally, the detailed analyzer 230 includes a Self-Collision tier 300 with collision severity and/or miss distance as tiebreakers 302. In some implementations, the detailed analyzer 230 includes a Default tier 300 and a Violates Constraints tier 300. The Violates Constraints may be a tier 300 for policies that will not be selected. For example, when a policy 210 would violate an acceleration constraint (i.e., a maximum acceleration), the detailed analyzer 230 may assign the policy 210 the Violates Constraints tier 300. No tiebreaker is needed, as these policies will not be selected. The Default tier 300 may include a single default policy 210 that the tier evaluator 240 selects if all other policies 210 are assigned the Violates Constraints tier. Optionally, the default policy is the BBW horizontal motion policy.

Figure 5B:
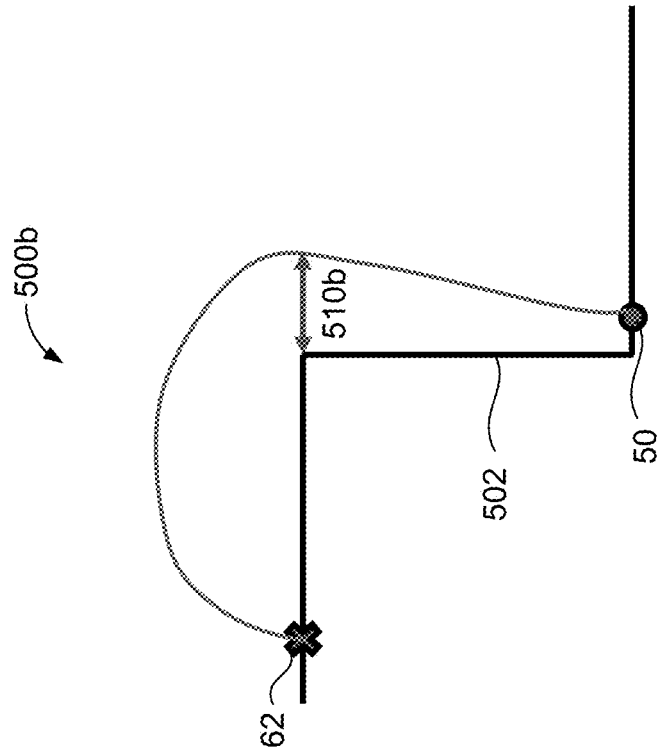
FIGS. 5A and 5B are example plots of two trajectories categorized as Cliff Scraping.
Figure 5A:
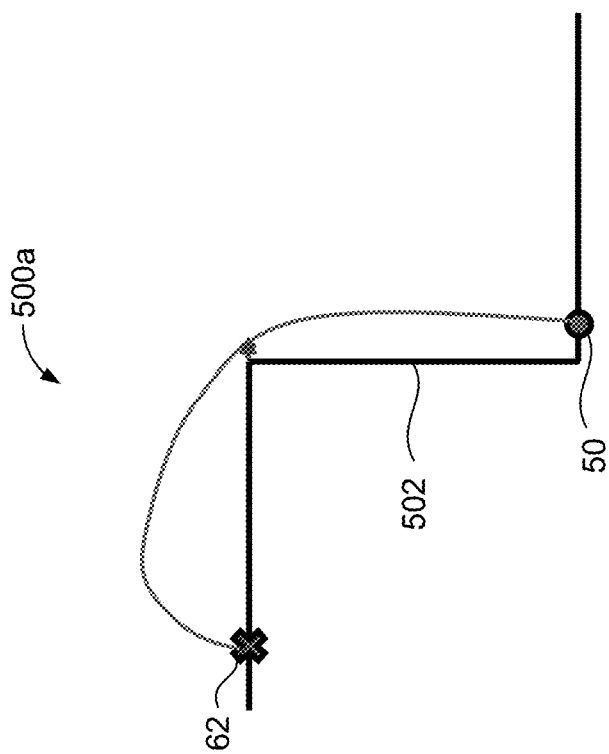

Referring now to FIG. 5A, in another example, a trajectory 500a may be categorized as Cliff Scraping when the trajectory 500a is very near or actually scrapes an obstacle 502 as the trajectory 500a of the leg moves from the current position 50 to the touchdown location 62. A trajectory may be categorized as Cliff Scraping when the obstacle 502 is actually scraped or when a horizontal margin 510 between the leg 12 and the obstacle 502 is less than a threshold distance (even if there is no scraping or collision with the obstacle). For example, the trajectory 500b of FIG. 5B may also be categorized as Cliff Scraping when the horizontal margin 510 is less than the threshold distance. In this scenario, trajectory 500b would be selected over trajectory 500a, as the tiebreaker (i.e., horizontal margin 510) is greater for the trajectory 500b.

Figure 6:
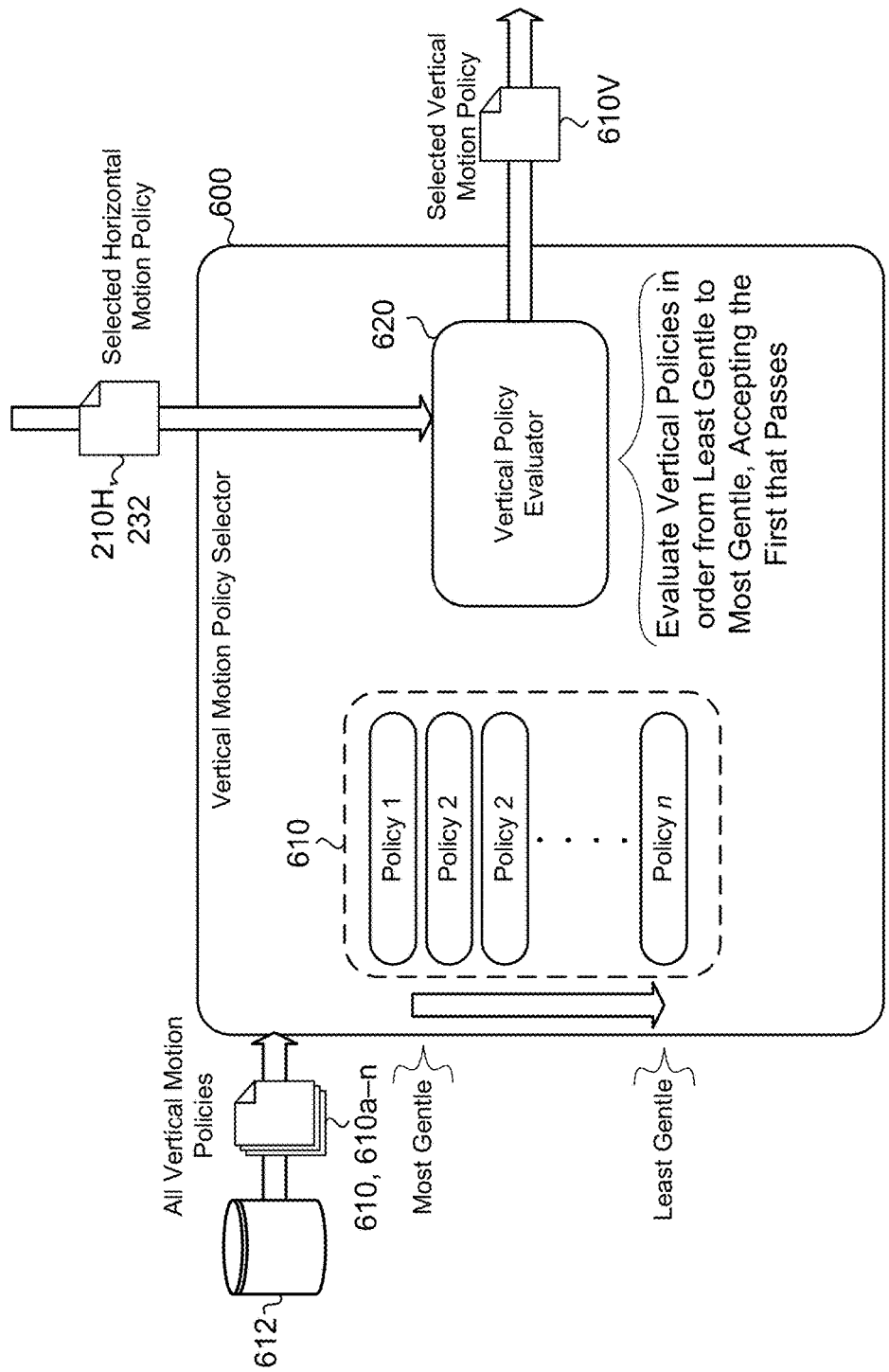
FIG. 6 is a schematic view of an example vertical motion policy selector of the robot of FIG. 1.

Referring now to FIG. 6, in some implementations, after the horizontal motion policy 210H is selected (FIGS. 2 and 3), the vertical motion policy selector 600 receives the selected horizontal motion policy 210H and each vertical motion policy 610, 610a-n from the vertical motion policy datastore 612. The vertical motion policy selector 600 may organize or categorize the vertical motion policies 610 based on a gentleness of the policy 610 (or, alternatively, an aggressiveness of the policy). For example, the vertical motion policy selector 600 may categorize a vertical motion policy 610 that has a lower peak acceleration as gentler than a policy 610 with a higher peak acceleration. The vertical motion policy selector 600 may include a vertical policy evaluator 620 that evaluates or analyzes the vertical motion policies 610 along with the selected horizontal motion policy 210H. In some examples, the vertical policy evaluator 620 determines the gentlest vertical motion policy 610 that successfully navigates the foot 19 of the robot 10 to the touchdown location 62 at the touchdown target time 64 with sufficient margin (i.e., the distance between the trajectory and the ground). That is, the vertical policy evaluator 620 may select the vertical motion policy 610V that is associated with a minimum acceleration and a minimum velocity that satisfies the vertical motion component of the leg swing trajectory. Satisfying the vertical motion component may be defined as arriving at the touchdown location 62 at the touchdown target time 64 with a threshold amount of margin from a collision with obstacles. In some examples, the vertical policy evaluator 620 evaluates the most gentle policy 610 not yet evaluated until a policy 610 is evaluated that satisfies the vertical motion component. Policies 610 after this point need not be evaluated. Alternatively, the vertical policy evaluator evaluates the least gentle policy 610 not yet evaluated until a policy 610 fails to satisfy the vertical motion component. Again, policies 610 after this point need not be evaluated.

In some examples, the vertical motion policy selector 600 selects special policies based upon unusual circumstances. For example, during a late touchdown (i.e., the robot 10 expected the leg to have achieved touchdown, but the leg has not yet done so), the selector 600 may select a special late touchdown policy that accelerates or decelerates to descend at a fixed velocity until touchdown is achieved. The policy selector 600 may select other special policies (and bypassing the standard selection sequence) when other unusual circumstances occur.

Thus, by decoupling the horizontal and vertical motion components of the swing leg trajectory and by performing the simple analysis with the most aggressive vertical motion policy 610A, the system 100 greatly reduces the number of policy combinations that are evaluated. For example, given M horizontal motion policies 210 and N vertical motion policies 610, a less sophisticated system may perform M×N evaluations, which is computationally expensive. In contrast, implementations herein may evaluate a maximum M+N policies (and generally far fewer) before selecting the ideal horizontal motion policy 210 and vertical motion policy 610.

Figure 7:
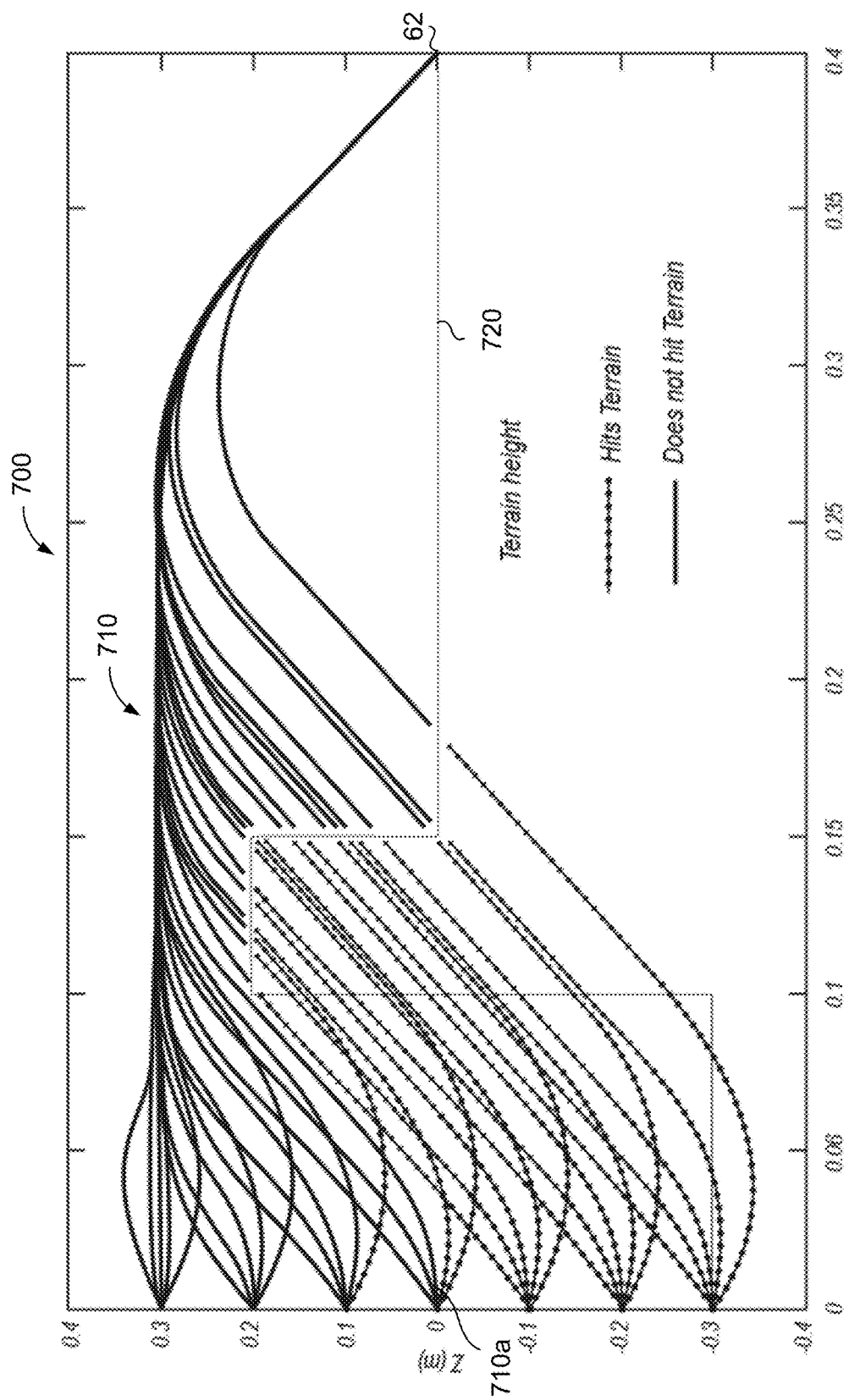
FIG. 7 is an example plot of multiple vertical trajectories with varying starting positions and velocities.

FIG. 7 illustrates a plot 700 of several vertical component swing trajectories 710 from seven different starting positions, each starting position showing five different starting velocities. The y-axis of the plot represents the height (in meters (m)) of the foot 19 of the robot 10, while the x-axis represents time (in seconds (s)). An obstacle 720 with varying height is also illustrated. Each trajectory 710, in this example, is set to the maximum height allowed by the constraints 232. As is apparent from FIG. 7, some starting locations (e.g., −0.3, −0.2, −0.1 in FIG. 7) in some terrain situations result in a collision regardless of which vertical motion policy 610 is selected. However, in the given example, if there is sufficient margin between the trajectory 710 and the obstacle 720, the vertical motion policy selector 600 may select a policy 610 that provides a gentler acceleration and still successfully arrive at the touchdown location 62 (i.e., not collide with the obstacle 720).

Figure 8:
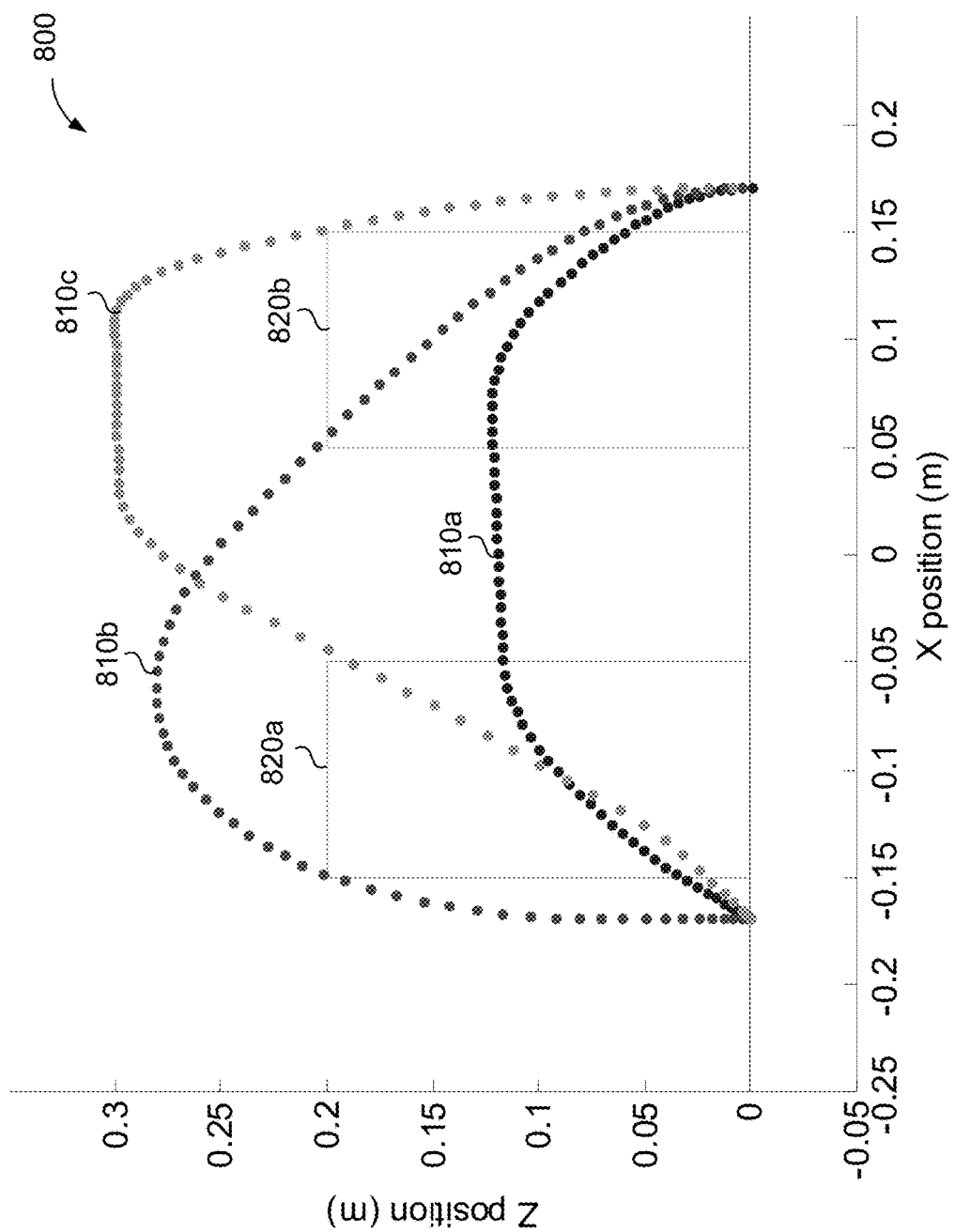
FIG. 8 is an example plot of multiple different policies and the interaction with obstacles.

Referring now to FIG. 8, a plot 800 of three vertical trajectories 810a-c for three different vertical motion policies 610 is illustrated. The y-axis represents height (in meters (m)) of the foot 19 of the robot 10 and the x-axis denotes horizontal position (in meters (m)) of the foot 19 of the robot 10. Trajectory 810a represents a trajectory that follows at least partially a Cubic vertical motion policy 610, trajectory 810b represents a trajectory that at least partially follows a WBB vertical motion policy 610 (i.e., the policy waits for the foot to rise before moving forward), and trajectory 810c represents a trajectory that follows at least partially a BBW vertical policy 610 (i.e., the policy starts accelerating the foot forward before attaining significant height). Also illustrated are two different obstacles 820a, 820b. In this example, the Cubic vertical motion policy trajectory 810a fails to pass either obstacle 820a, 820b. In contrast, the WBB vertical motion policy trajectory 810b successfully passes the obstacle 820a but collides with the obstacle 820b, while the BBW vertical motion policy trajectory 810c collides with the obstacle 820a, but successfully passes the obstacle 820b. Thus, when presented with just the obstacle 820a, the vertical motion policy selector 600 may select the WBB vertical motion policy 610, while when presented with just the obstacle 820b, the vertical motion policy selector 600 may select the BBW vertical motion policy 610. When both obstacles 820a, 820b are present, the vertical motion policy selector 600 may select none of the vertical motion policies 610 associated with the trajectories 810a, 810b, 810c. The vertical motion policy selector 600 may be constrained by a variable amount of margin (i.e., how close the leg may pass to ab obstacle). Here, the required margin was zero and the trajectories 810b, 810c brush the corner of the respective obstacle 820a, 820b.

Figure 9:
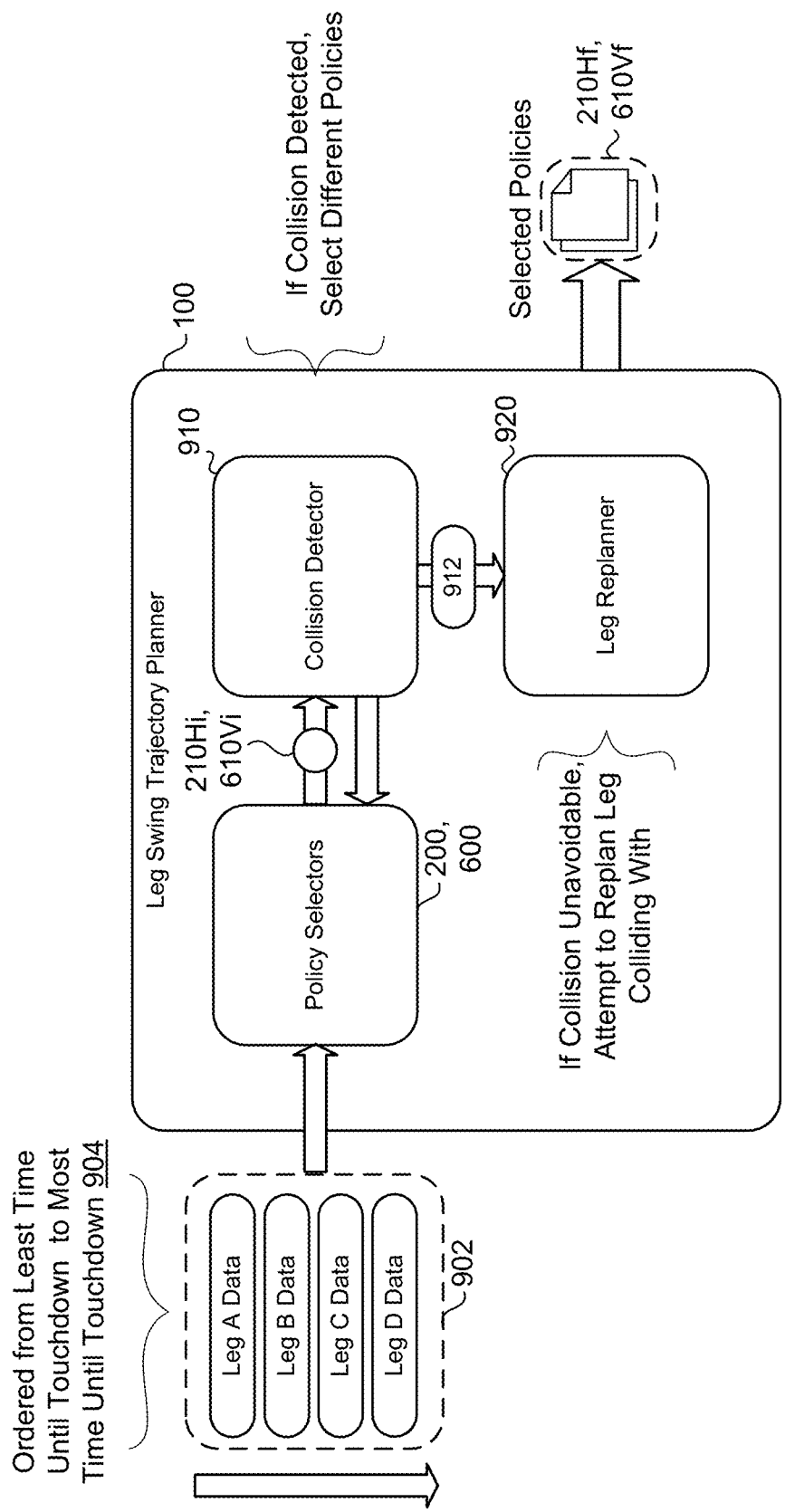
FIG. 9 is a schematic view of example components of the robot of FIG. 1 that include a collision detector and a leg replanner.

Referring now to FIG. 9, in some implementations, the leg swing trajectory planner 100 plans the leg swing trajectory of the leg 12 of the robot 10 that has the least time remaining until touchdown. That is, the planner 100 plans the leg 12 of the robot 10 that is next to hit the ground, and then plans the second leg that is next to hit the ground after the first leg 12, and so on. This is advantageous, as the leg 12 with the least amount of time until touchdown has the least amount of freedom to adjust trajectory. That is, legs with more time until touchdown have more freedom to adjust trajectories to avoid collisions with other legs. In some examples, the leg swing trajectory planner 100 determines a touchdown order 904 based on leg data 902 from each leg 12 (e.g., the current position 50, the current velocity 52, the touchdown location 62, the touchdown target time 64, etc.). Based on the touchdown order, the system 100 may select the policies 210, 610 for each leg in a planning order based on the touchdown order.

The leg swing trajectory planner 100 may include a collision detector 910. The collision detector 910 receives initial selected policies 210Hi, 610Vi from the policy selectors 200, 600 and checks for collisions with previously planned legs. For example, the leg swing trajectory planner may plan leg 'A' first (as it is the next to make touchdown). Afterward, while planning leg 'B' (as, in this example, it is the next to make touchdown after leg 'A'), the collision detector 910 may determine if the selected policies 210H, 610V for leg 'B' will cause leg 'B' to collide with leg 'A'. When a collision is detected, the leg swing trajectory planner 100 may attempt to select new policies for the colliding leg (in this example, leg 'B'), as the colliding leg has more time until touchdown, and hence more flexibility regarding policies 210, 610. In the event that a collision is unavoidable (i.e., selecting new policies does not alleviate the collision), the collision detector 910, in some examples, sends a replan signal 912 to leg replanner 920 in order to replan the previously planned leg (i.e., leg 'A') in an attempt to avoid the collision. The leg replanner 920 outputs the final selected policies 210Hf, 610Hf which may be the same as the initial selected policies 210Hi, 610Vi or different (e.g., due to replanning).

Figure 10:
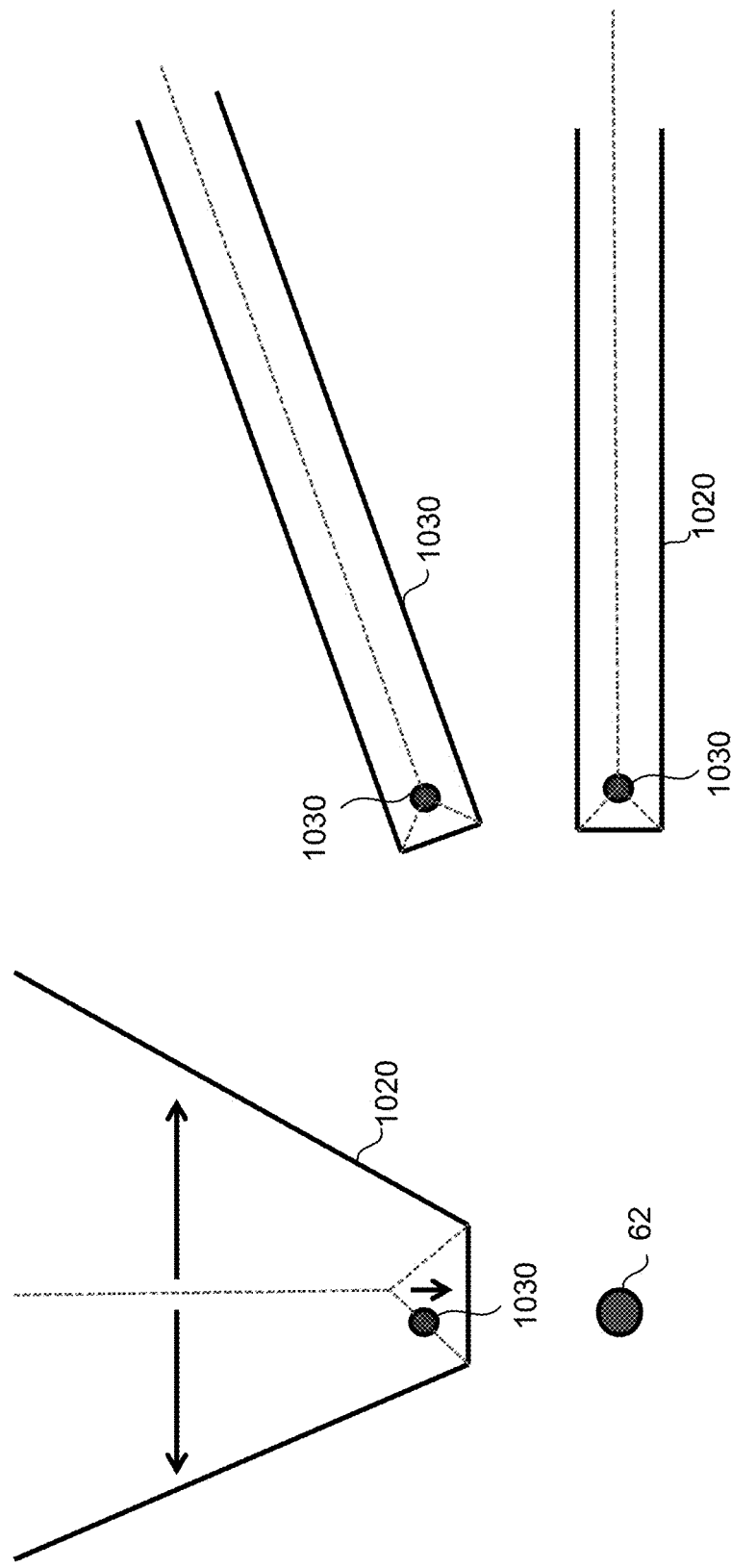
FIG. 10 is a schematic view of example keep-out areas of other legs of the robot.

The leg swing trajectory planner 100, in some implementations, projects "keep-out" areas around each leg to aid in avoiding self-collisions. Referring now to FIG. 10, the leg swing trajectory planner may select policies 210, 610, that arrive at the touchdown location 62 while avoiding touchdown locations of other legs 1030 and corresponding keep-out areas 1020.

Figure 11B:
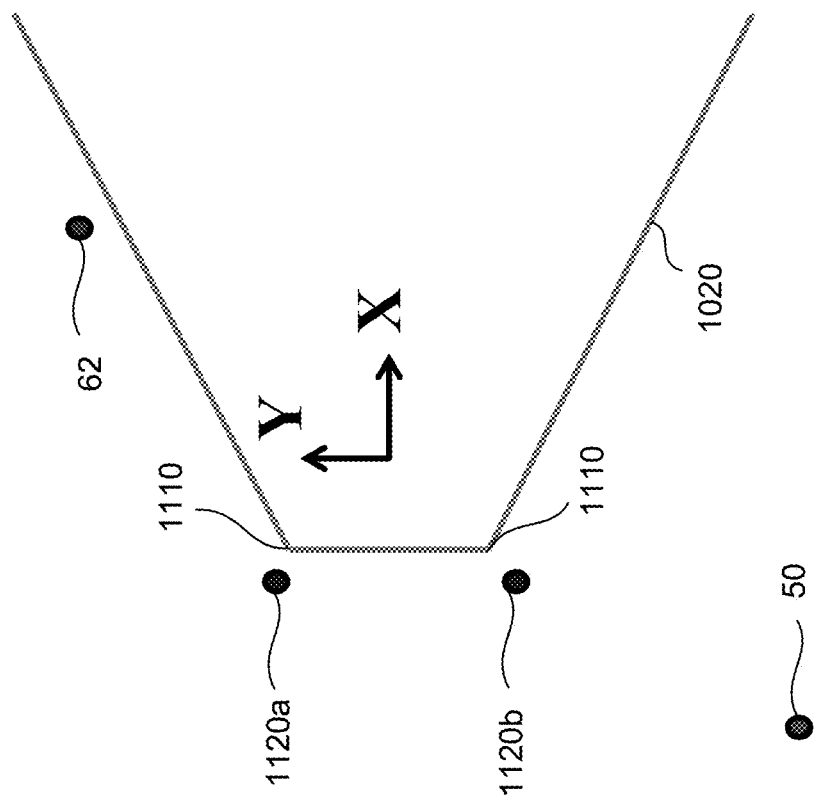
FIGS. 11A-11C are schematic views of an example Swing Around policy for swinging around another leg of the robot.
Figure 11A:
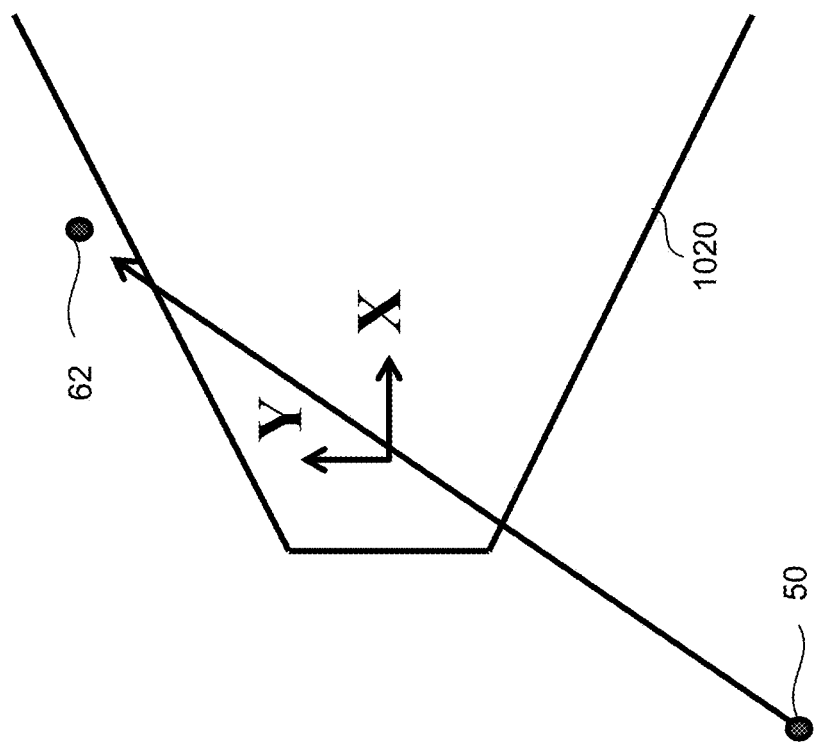
Figure 11C:
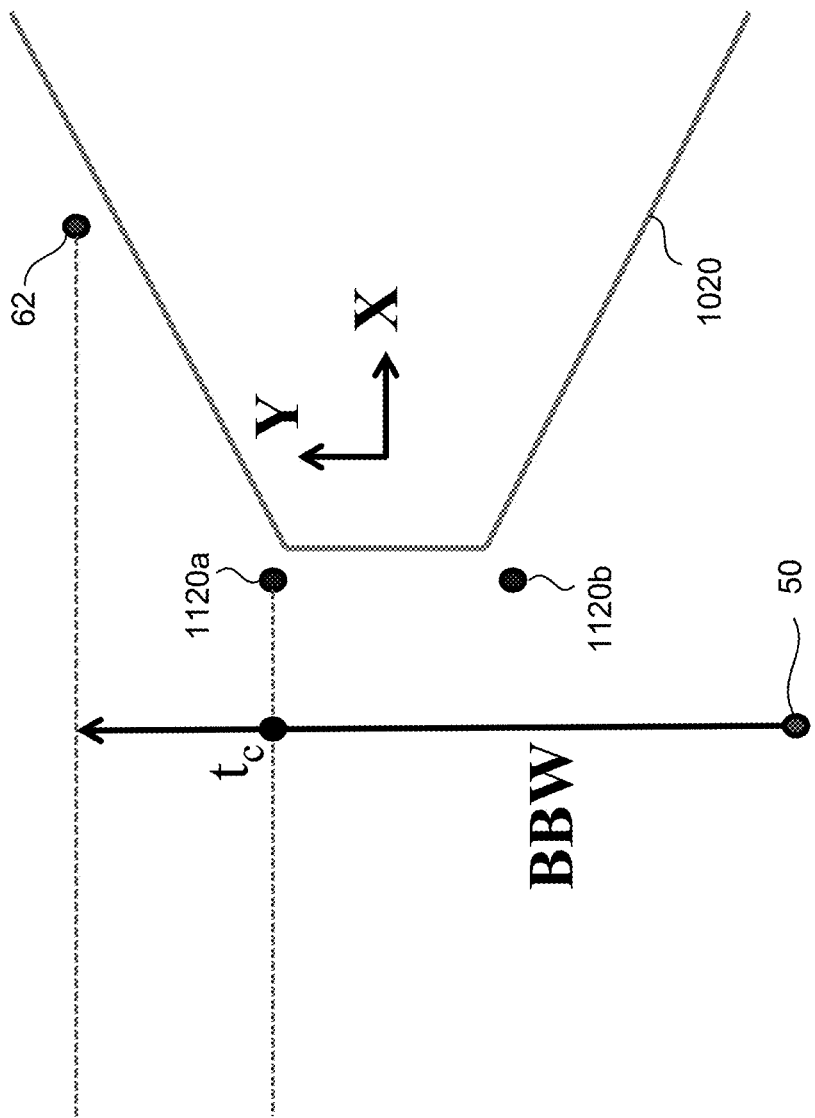

Referring now to FIGS. 11A-C, in some implementations, the horizontal motion policies 210 are further separated into an x-coordinate policy (e.g., a forward/backward or longitudinal motion policy) and a y-coordinate policy (e.g., a lateral motion policy). As illustrated in FIG. 11A, in some situations, the horizontal motion policy selector 200 may need to plan a leg trajectory that crosses over another leg 12 of the robot 10 (e.g., during a turn or recovering from a trip). That is, the horizontal motion policy selector 200 may need to plan from a current position 50 to a touchdown location 62 that crosses the keep-out area 1020 of another leg 12 of the robot 10 (FIG. 11A). In such a situation, planning a trajectory directly from the current position 50 to the touchdown location 62 will cross through the keep-out area 1020 and potentially cause a collision with the other leg 12. Instead, the horizontal motion policy selector 200 may execute a Swing Around policy 210 to maneuver the leg 12 around the keep-out area 1020. The horizontal motion policy selector 200, in some examples, determines locations of corners 1110 of a polygon that represents the keep-out area 1020. The planner 100 may place waypoints 1120a, 1120b a threshold distance (i.e., a margin) from the corners 1110 (FIG. 11B).

As illustrated in FIG. 11C, the horizontal motion policy selector 200 may separate the x and y movement required to reach the touchdown location 62. For example, the selector 200 may plan a BBW horizontal motion policy 210 to maneuver the leg 12 from the current location 50 to a point beyond waypoint 1120a. The horizontal motion policy selector 200 may determine an amount of time $t_c$ until the leg 12 reaches the waypoint 1120a in they axis. The horizontal motion policy selector 200 may ensure that there is no movement in the x direction toward the waypoints 1120a, 1120b until at least $t_c$ time has passed. In some examples, the planner 100 may swing the leg over a keep-out area 1020 when possible. For example, if the contralateral leg is slanted, there may be an opportunity to swing over a portion of the keep-out area 1020 without colliding with the contralateral leg. In this scenario, the planner 100 may flag the possibility for future evaluation when selecting the vertical motion policy 610.

Figure 12:
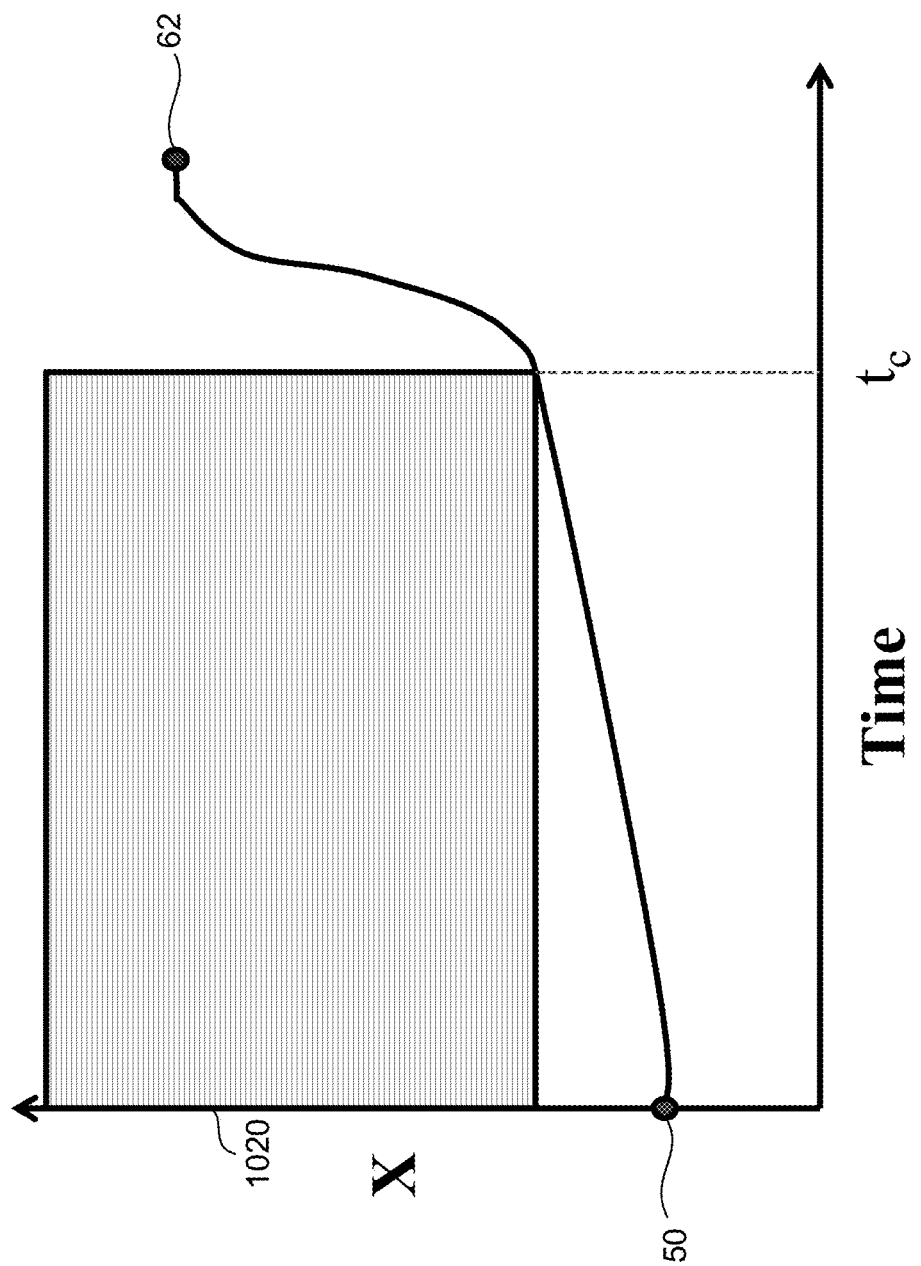
FIG. 12 is a schematic view of an example horizontal trajectory of the Swing Around policy.

FIG. 12 illustrates a plot of x position versus time in a Swing Around policy 210. As illustrated, the horizontal motion policy selector 200 may select a policy 210 that accelerates until either a velocity limit is reached, further acceleration will overshoot the touchdown location 62, or maintaining the current velocity will enter the keep-out area 1020. In the illustrated example, the policy 210 accelerates the leg briefly until coasting (i.e., maintaining the current velocity) clips or touches the corner of the keep-out area 1020. From this point, the leg 12 coasts until time $t_c$ (i.e., the leg is past the corner of the keep-out area 1020) and then accelerates in the direction of the touchdown location 62 (e.g., with a BBW policy 210).

Figure 13:
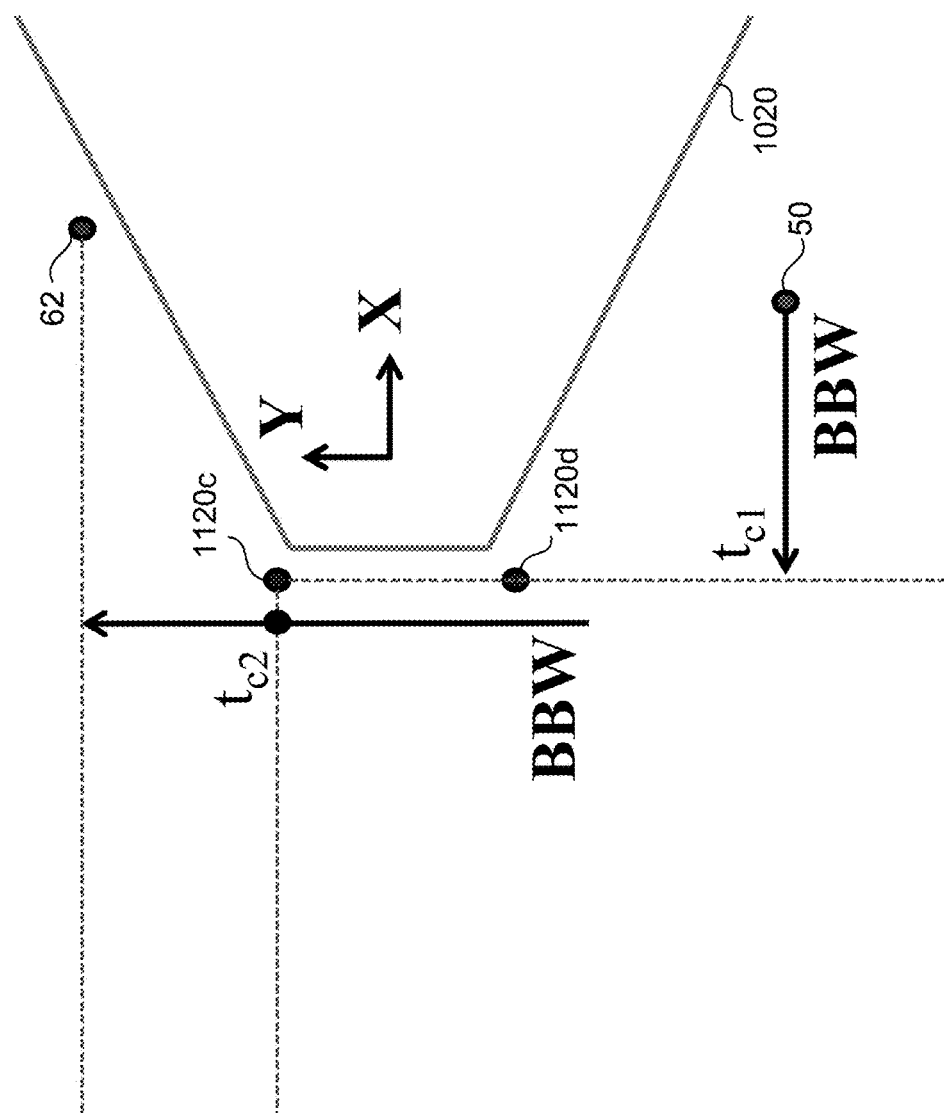
FIG. 13 is a schematic view of another example horizontal trajectory of the Swing Around policy.

In some situations, the horizontal motion policy selector 200 may to further separate the motion components of the required trajectory. As illustrated in FIG. 13, in some situations, the current location 50 lies on the other side of the keep-out area 1020 from the touchdown location 62. In this situation, the horizontal motion policy selector 200 may perform a BBW policy (to the left in FIG. 13) to pass waypoint 1120d. The horizontal motion policy selector 200 may determine the time until the waypoint 1120d is passed ($t_{c1}$) and then perform another BBW policy 210 (upward in FIG. 13), then perform the remaining operations similarly as described with regards to FIGS. 11A-C.

Figure 14:
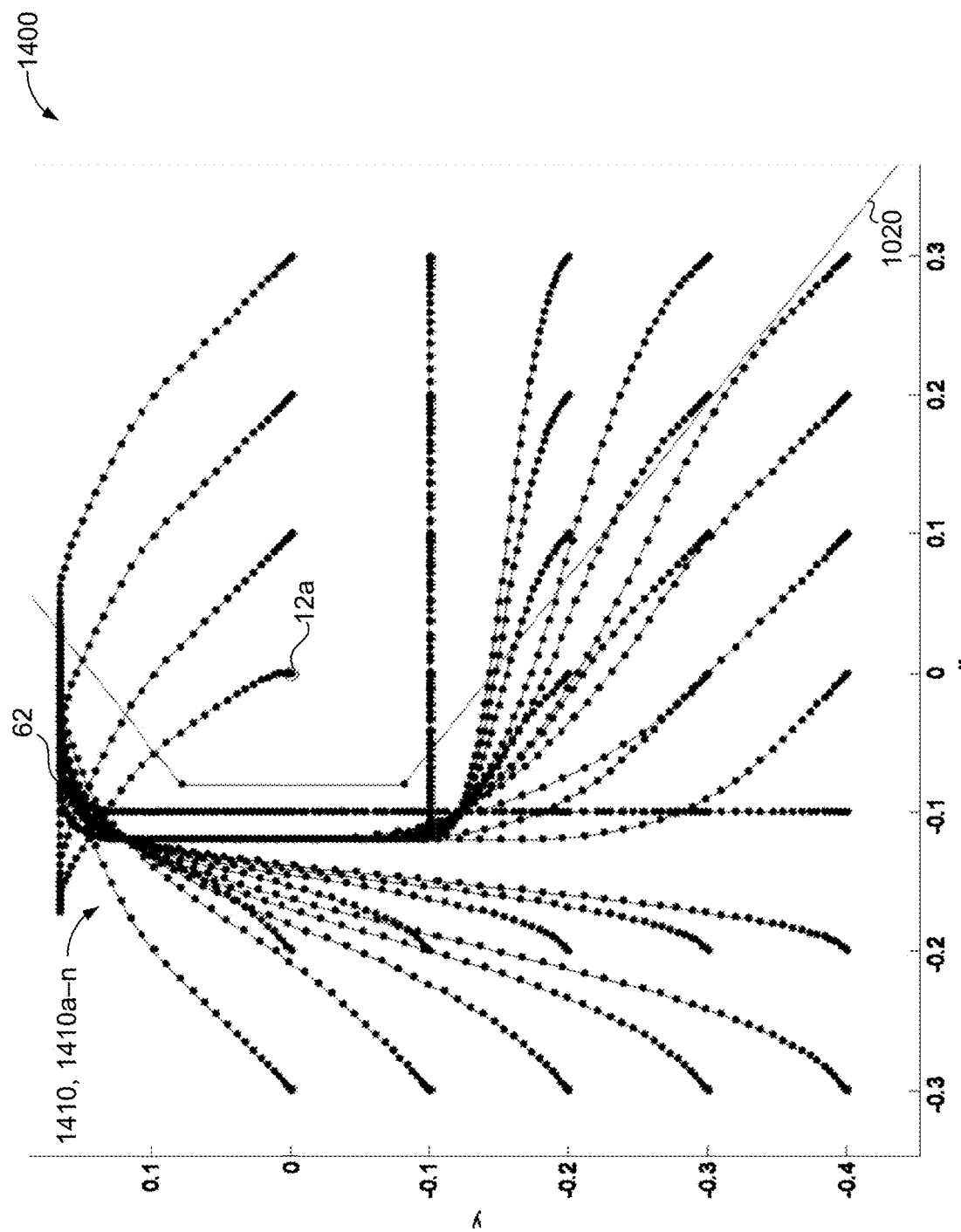
FIG. 14 is an example plot of multiple Swing Around trajectories starting from various starting location.

Referring now to FIG. 14, several Swing Around trajectories 1410, 1410a-n are shown on a plot 1400 from various starting locations, each attempting to reach the touchdown location 62. The x-axis of the plot 1400 represents position of the leg 12 in the x-dimension while the y-axis of the plot 1400 represents the position of the leg 12 in the y-dimension. The Swing Around policy 210 attempts to avoid the keep-out area 1020 (and the leg 12a that is the source of the keep-out area 1020).

While the illustrated examples of the Swing Around policy combine multiples of the same policy (e.g., BBW) to reach the touchdown location 62, the policy selector 200, in some implementations, combines different horizontal motion policies 210 as well. The horizontal motion policy selector 200 may combine different policies 210 by axis. For example, the selector 200 may select a BBW horizontal motion policy 210 in the x-dimension and a Cubic horizontal policy 210 in the y-dimension. The horizontal motion policy selector 200 may also combine policies 210 by time. For example, the horizontal motion policy selector 200 may select a BBW horizontal motion policy 210 for the first ten percent (or select number of seconds) of the swing and then switch to a Cubic horizontal policy 210 for the remainder of the swing. Combined policies, in other examples, are predefined (e.g., by a human operator) and the horizontal motion policy selector 200 may select the predefined combined policies.

Figure 15:
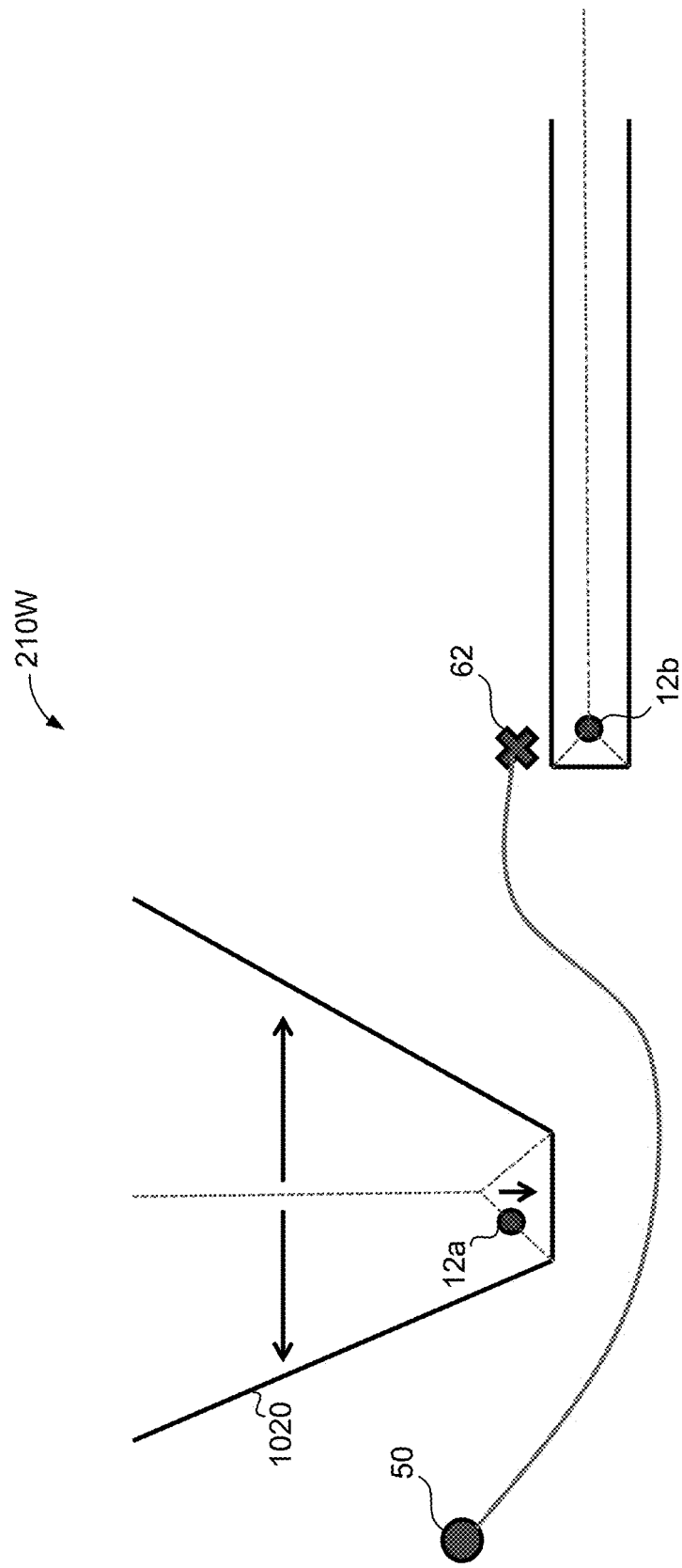
FIG. 15 is a schematic view of an example Wiggle policy for maneuvering around multiple other legs of the robot.

Referring now to FIG. 15, a single horizontal motion policy 210 (e.g., a Wiggle policy 210W) may include any combination of individual horizontal motion policies (cubic, BBW, WBB, etc.) to reach the touchdown location 62. As illustrated in FIG. 15, in some scenarios, the horizontal motion policy selector 200 may need select policies 210 to maneuver the leg 12 around multiple other legs 12a, 12b and the associated keep-out areas 1020 of the robot 10.

Figure 16:
FIG. 16 is an example table of types of trips and appropriate policy responses.

Referring now to FIG. 16, in some implementations, the leg swing trajectory planner 100 selects specific policies 210, 610 in response to the environment around the robot 10 or in response to determined or detected behavior. For example, when the planner 100 determines that the robot is maneuvering through level and unobstructed terrain, the planner 100 may default to a select policies 210, 610 without requiring any detailed analysis by the detailed analyzer 230. In another example, the planner 100 may receive an indication of a trip by the robot 10 and react with the default policies 210, 610 associated with tripping. The trip policies may include horizontal motion policies 210 and vertical motion policies 610 or, alternatively, only horizontal motion policies 210. As illustrated in FIG. 16, the planner 100 may react to a normal trip, a recent normal trip, a knee trip, a self-collision where the legs are crossed, and a self-collision where the legs are not crossed. For example, in response to a knee trip, the planner 100 may move the knee slowly forward to recover. During a normal trip, the planner 100 may cease forward longitudinal movement of the swing leg 12 and elevate the foot 19. During a crossed self-collision, the planner 100 may attempt to disentangle the swing leg, while during an uncrossed self-collision, the planner 100 may attempt to move away from the stance leg laterally and continue moving towards the touchdown location 62.

Thus, the swing leg trajectory planner 100 decouples the swing trajectory of the leg 12 of the robot 10 into horizontal and vertical components. By first decoupling the horizontal and vertical components, the planner 100 reduces overall complexity and processing requirements. This allows the planner 100 to plan and replan the swing leg trajectories at a high frequency. For example, the planner 100 may plan a swing leg trajectory in 100 microseconds or less to allow the robot 10 to rapidly react to changes in the environment or to collisions with the robot 10. Because a leg swing typically ranges from 200 milliseconds to over 600 milliseconds in duration, the planner 100 may replan the leg many times prior to touchdown. In some examples, the planner 100 plans each leg every three milliseconds. The planner 100 attempts to ensure that all constraints 232 are met while avoiding collisions with obstacles and self-collisions. When all constraints cannot be met and/or the touchdown location 62 or touchdown time 64 cannot be met, the planner 100 may provide graceful degradation by prioritizing (e.g., via the tier evaluator 240) which constraints/requirements are met. The planner may also improve aesthetics and balance by, for example, minimizing lifting of the leg during the swing and keeping the swing trajectory smooth.

Figure 17:
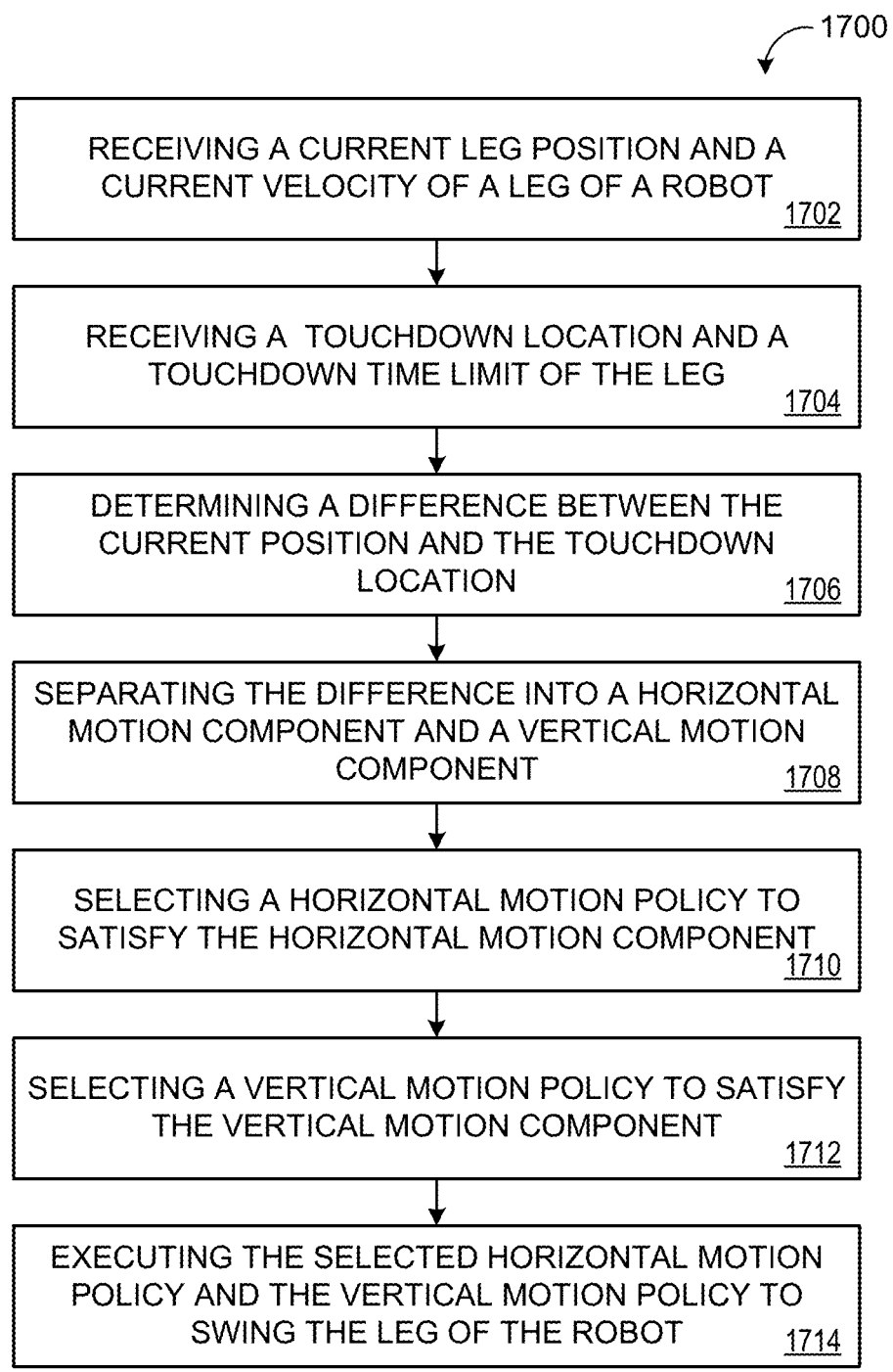
FIG. 17 is a flowchart of an example arrangement of operations for a method of planning a swing trajectory for a leg of a robot.

FIG. 17 is a flowchart of an exemplary arrangement of operations for a method 1700 for planning swing leg trajectories of a robot 10. At operation 1602, the method 1700 includes receiving, at data processing hardware 36, an initial position 50 of a leg 12 of the robot 10 and an initial velocity 52 of the leg 12 of the robot 10. Here, the data processing hardware 36 executes the leg swing trajectory planner 100 and may reside on the robot 10, a remote system/device in communication with the robot 10, or a combination thereof. At operation 1704, the method 1700 includes receiving, at the data processing hardware 36, a touchdown location 62 for the leg 12 and a touchdown target time 64 for the leg 12. The touchdown target time 64 represents an amount of time until the leg 12 of the robot 10 should touchdown at the touchdown location 62.

At operation 1706, the method 1700 includes determining, by the data processing hardware 36, a difference between the initial position 50 of the leg and the touchdown location 62 and, at operation 1708, the method 1700 includes separating, by the data processing hardware 36, the difference between the initial position 50 of the leg 12 and the touchdown location 62 into a horizontal motion component and a vertical motion component.

At operation 1710, the method 1700 includes selecting, by the data processing hardware 36, a horizontal motion policy 210 from a set of horizontal motion policies to satisfy the horizontal motion component. Each horizontal motion policy produces a horizontal trajectory as a function of the initial position 50 of the leg 12, the initial velocity 52 of the leg 12, the touchdown location 62 of the leg 12, and the touchdown target time 64 of the leg 12. The method 1700 also includes, at operation 1712, selecting, by the data processing hardware 36, a vertical motion policy 610 from a set of vertical motion policies to satisfy the vertical motion component. Each vertical motion policy 610 produces a vertical trajectory as a function of the initial position 50 of the leg 12, the initial velocity 52 of the leg 12, the touchdown location 62 of the leg 12, and the touchdown target time 64 of the leg 12. At operation 1714, the method 1700 includes executing, by the data processing hardware 36, the selected horizontal motion policy 210 and the selected vertical motion policy 610 to swing the leg 12 of the robot 10 from the initial position 50 to the touchdown location 62 at the touchdown target time 64.

Figure 18:
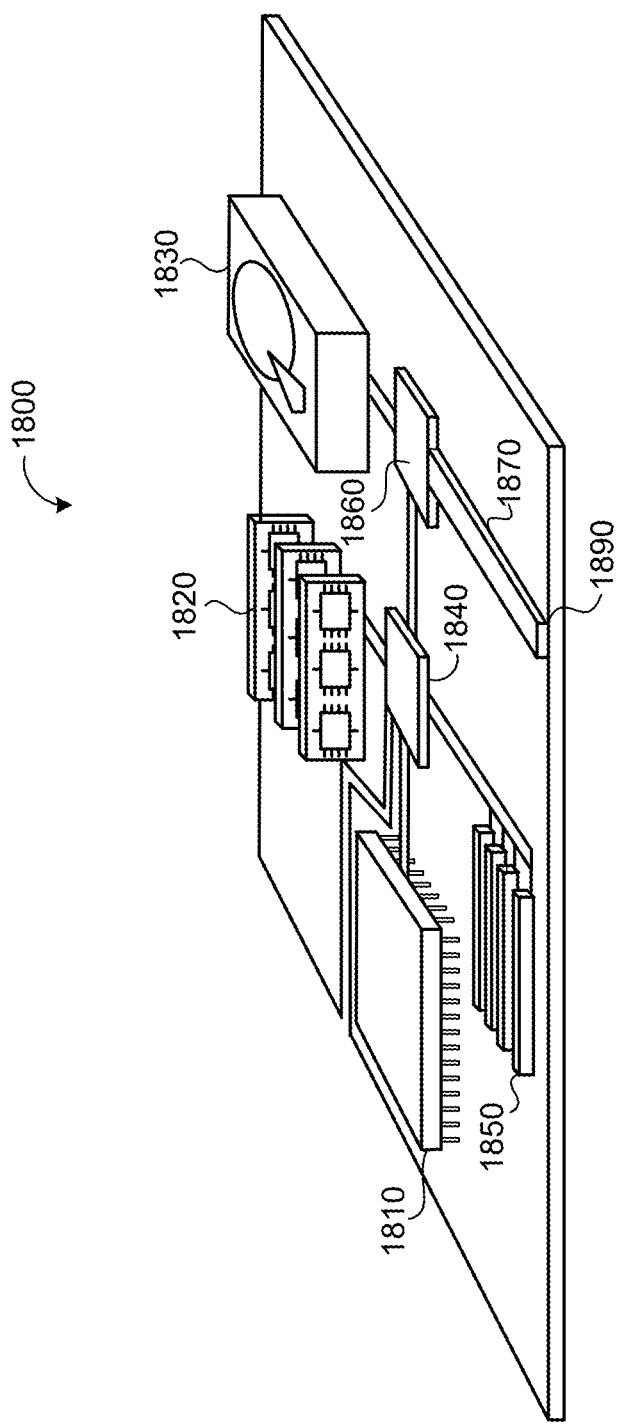
FIG. 18 is a schematic view of an example computing device that may be used to implement the systems and methods described herein.

FIG. 18 is schematic view of an example computing device 1800 that may be used to implement the systems and methods described in this document (e.g., data processing hardware 36 and memory hardware 20). The components shown here, their connections and relationships, and their functions, are meant to be exemplary only, and are not meant to limit implementations of the inventions described and/or claimed in this document.

The computing device 1800 includes a processor 1810 (e.g., data processing hardware 36), memory 1820 (e.g., memory hardware 38), a storage device 1830, a high-speed interface/controller 1840 connecting to the memory 1820 and high-speed expansion ports 1850, and a low speed interface/controller 1860 connecting to a low speed bus 1870 and a storage device 1830. Each of the components 1810, 1820, 1830, 1840, 1850, and 1860, are interconnected using various busses, and may be mounted on a common motherboard or in other manners as appropriate. The processor 1810 can process instructions for execution within the computing device 1800, including instructions stored in the memory 1820 or on the storage device 1830 to display graphical information for a graphical user interface (GUI) on an external input/output device, such as display 1880 coupled to high speed interface 1840. In other implementations, multiple processors and/or multiple buses may be used, as appropriate, along with multiple memories and types of memory. Also, multiple computing devices 1800 may be connected, with each device providing portions of the necessary operations (e.g., as a server bank, a group of blade servers, or a multi-processor system).

The memory 1820 stores information non-transitorily within the computing device 1800. The memory 1820 may be a computer-readable medium, a volatile memory unit(s), or non-volatile memory unit(s). The non-transitory memory 1820 may be physical devices used to store programs (e.g., sequences of instructions) or data (e.g., program state information) on a temporary or permanent basis for use by the computing device 1800. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 1830 is capable of providing mass storage for the computing device 1800. In some implementations, the storage device 1830 is a computer-readable medium. In various different implementations, the storage device 1830 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 1820, the storage device 1830, or memory on processor 1810.

The high speed controller 1840 manages bandwidth-intensive operations for the computing device 1800, while the low speed controller 1860 manages lower bandwidth-intensive operations. Such allocation of duties is exemplary only. In some implementations, the high-speed controller 1840 is coupled to the memory 1820 and to the high-speed expansion ports 1850, which may accept various expansion cards (not shown). In some implementations, the low-speed controller 1860 is coupled to the storage device 1830 and a low-speed expansion port 1890. The low-speed expansion port 1890, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

A number of implementations have been described. Nevertheless, it will be understood that various modifications may be made without departing from the spirit and scope of the disclosure. Accordingly, other implementations are within the scope of the following claims.

What is claimed is:

1. A method comprising:
   receiving, at data processing hardware of a robot, an initial position of a leg of the robot and an initial velocity of the leg of the robot;
   receiving, at the data processing hardware, a touchdown location for the leg and a touchdown target time for the leg, the touchdown target time representing an amount of time until the leg of the robot should touchdown at the touchdown location;
   determining, by the data processing hardware, a difference between the initial position of the leg and the touchdown location;
   separating, by the data processing hardware, the difference between the initial position of the leg and the touchdown location into a horizontal motion component and a vertical motion component;
   selecting, by the data processing hardware, a horizontal motion policy from a set of horizontal motion policies to satisfy the horizontal motion component, each horizontal motion policy producing a horizontal trajectory as a function of the initial position of the leg, the initial velocity of the leg, the touchdown location of the leg, and the touchdown target time of the leg;
   selecting, by the data processing hardware, a vertical motion policy from a set of vertical motion policies to satisfy the vertical motion component, each vertical motion policy producing a vertical trajectory as a function of the initial position of the leg, the initial velocity of the leg, the touchdown location of the leg, and the touchdown target time of the leg; and
   executing, by the data processing hardware, the selected horizontal motion policy and the selected vertical motion policy to swing the leg of the robot from the initial position to the touchdown location at the touchdown target time.

2. The method of claim 1, further comprising:
   determining, by the data processing hardware, a most aggressive vertical motion policy of the set of vertical motion policies, the most aggressive vertical motion policy maximizing vertical acceleration of the leg within a vertical acceleration limit of the leg and maximizing vertical velocity of the leg within a vertical velocity limit of the leg,
   wherein selecting the horizontal motion policy from the set of horizontal motion policies comprises evaluating each horizontal motion policy of the set of horizontal motion policies with the most aggressive vertical motion policy.

3. The method of claim 1, wherein selecting the horizontal motion policy from the set of horizontal motion policies comprises:
   assigning each horizontal motion policy of the set of horizontal motion policies a tier from a plurality of tiers, each tier associated with an amount of preference for selecting the respective tier, and each tier comprising a tiebreaking parameter, the tiebreaking parameter associated with each horizontal motion policy of the set of horizontal motion policies; and
   selecting the horizontal motion policy from the set of horizontal motion policies based on the assigned tiers and the tiebreaking parameters.

4. The method of claim 3, wherein the tiebreaking parameter comprises a total undesirability based on a sum of a horizontal undesirability and a vertical undesirability.

5. The method of claim 1, wherein selecting the vertical motion policy from the set of vertical motion policies occurs after selecting the horizontal motion policy from the set of horizontal motion policies.

6. The method of claim 5, wherein selecting the vertical motion policy from the set of vertical motion policies comprises selecting the vertical motion policy from the set of vertical motion policies associated with a minimum acceleration and a minimum velocity that satisfies the vertical motion component.

7. The method of claim 1, further comprising:
receiving, at the data processing hardware, an indication of a trip by the robot; and
in response to receiving the indication of the trip by the robot, selecting, by the data processing hardware, one of:
a horizontal motion policy from a second set of horizontal motion policies, the second set of horizontal motion policies associated with tripping; or
a vertical motion policy from a second set of vertical motion policies, the second set of vertical motion policies associated with tripping.

8. The method of claim 1, wherein selecting the horizontal motion policy from the set of horizontal motion policies comprises:
evaluating each horizontal motion policy of the set of horizontal motion policies with a first analysis; and
evaluating a sub-set of the set of horizontal motion policies with a second analysis based on the first analysis;
wherein the second analysis is more detailed than the first analysis.

9. The method of claim 1, further comprising:
receiving, at the data processing hardware, the touchdown target time for each of a plurality of legs of the robot;
determining, at the data processing hardware, a touchdown order of the legs based on the touchdown target time for each of the plurality of legs of the robot; and
selecting, by the data processing hardware, the horizontal motion policy and the vertical motion policy for each leg in a planning order based on the touchdown order.

10. The method of claim 1, wherein each vertical motion policy of the set of vertical motion policies comprises a maximum velocity, a maximum acceleration, and a swing height.

11. The method of claim 1, wherein at least one horizontal motion policy of the set of horizontal motion policies comprises a lateral motion policy and a longitudinal motion policy.

12. A robot comprising:
a body;
legs coupled to the body and configured to maneuver the robot about an environment;
data processing hardware in communication with the legs; and
memory hardware in communication with the data processing hardware, the memory hardware storing instructions that when executed on the data processing hardware cause the data processing hardware to perform operations comprising:
receiving an initial position of a leg of the robot and an initial velocity of the leg of the robot;
receiving a touchdown location for the leg and a touchdown target time for the leg, the touchdown target time representing an amount of time until the leg of the robot should touchdown at the touchdown location;
determining a difference between the initial position of the leg and the touchdown location;
separating the difference between the initial position of the leg and the touchdown location into a horizontal motion component and a vertical motion component;
selecting a horizontal motion policy from a set of horizontal motion policies to satisfy the horizontal motion component, each horizontal motion policy producing a horizontal trajectory as a function of the initial position of the leg, the initial velocity of the leg, the touchdown location of the leg, and the touchdown target time of the leg;
selecting a vertical motion policy from a set of vertical motion policies to satisfy the vertical motion component, each vertical motion policy producing a vertical trajectory as a function of the initial position of the leg, the initial velocity of the leg, the touchdown location of the leg, and the touchdown target time of the leg; and
executing the selected horizontal motion policy and the selected vertical motion policy to swing the leg of the robot from the initial position to the touchdown location at the touchdown target time.

13. The robot of claim 12, wherein the operations further comprise:
determining a most aggressive vertical motion policy of the set of vertical motion policies, the most aggressive vertical policy maximizing vertical acceleration of the leg within a vertical acceleration limit of the leg and maximizing vertical velocity of the leg within a vertical velocity limit of the leg,
wherein selecting the horizontal motion policy from the set of horizontal motion policies comprises evaluating each horizontal motion policy of the set of horizontal motion policies with the most aggressive vertical motion policy.

14. The robot of claim 12, wherein selecting the horizontal motion policy from the set of horizontal motion policies comprises:
assigning each horizontal motion policy of the set of horizontal motion policies a tier from a plurality of tiers, each tier associated with an amount of preference for selecting the respective tier, and each tier comprising a tiebreaking parameter, the tiebreaking parameter associated with each horizontal motion policy of the set of horizontal motion policies; and
selecting the horizontal motion policy from the set of horizontal motion policies based on the assigned tiers and the tiebreaking parameters.

15. The robot of claim 14, wherein the tiebreaking parameter comprises a total undesirability based on a sum of a horizontal undesirability and a vertical undesirability.

16. The robot of claim 12, wherein selecting the vertical motion policy from the set of vertical motion policies occurs after selecting the horizontal motion policy from the set of horizontal motion policies.

17. The robot of claim 16, wherein selecting the vertical motion policy from the set of vertical motion policies comprises selecting the vertical motion policy from the set of vertical motion policies associated with a minimum acceleration and a minimum velocity that satisfies the vertical motion component.

18. The robot of claim 12, wherein the operations further comprise:
receiving an indication of a trip by the robot; and
in response to receiving the indication of the trip by the robot, selecting one of:
a horizontal motion policy from a second set of horizontal motion policies, the second set of horizontal motion policies associated with tripping; or
a vertical motion policy from a second set of vertical motion policies, the second set of vertical motion policies associated with tripping.

19. The robot of claim 12, wherein selecting the horizontal motion policy from the set of horizontal motion policies comprises:
- evaluating each horizontal motion policy of the set of horizontal motion policies with a first analysis; and
- evaluating a sub-set of the set of horizontal motion policies with a second analysis based on the first analysis;
- wherein the second analysis is more detailed than the first analysis.

20. The robot of claim 12, wherein the operations further comprise:
- receiving the touchdown target time for each of a plurality of legs of the robot;
- determining, at the data processing hardware, a touchdown order of the legs based on the touchdown target time for each of the plurality of legs of the robot; and
- selecting the horizontal motion policy and the vertical motion policy for each leg in a planning order based on the touchdown order.

21. The robot of claim 12, wherein each vertical motion policy of the set of vertical motion policies comprises a maximum velocity, a maximum acceleration, and a swing height.

22. The robot of claim 12, wherein at least one horizontal motion policy of the set of horizontal motion policies comprises a lateral motion policy and a longitudinal motion policy.

* * * * *